(12) United States Patent
Kukreja et al.

(10) Patent No.: US 7,330,971 B1
(45) Date of Patent: Feb. 12, 2008

(54) DELEGATED ADMINISTRATION OF NAMESPACE MANAGEMENT

(75) Inventors: Sachin Kukreja, Seattle, WA (US); Barry I. Kelman, Woodinville, WA (US); Steven M. Cellini, Seattle, WA (US); David R. Shutt, Bellevue, WA (US); Roy Leban, Redmond, WA (US); Daniel Doubrovkine, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 829 days.

(21) Appl. No.: 10/675,255

(22) Filed: Sep. 30, 2003

Related U.S. Application Data

(63) Continuation of application No. 10/044,565, filed on Jan. 11, 2002, now abandoned.

(51) Int. Cl.
H04L 9/00 (2006.01)
(52) U.S. Cl. .................. 713/168; 709/203; 709/229
(58) Field of Classification Search ............ 713/168, 713/156, 175; 709/230, 203, 229; 719/328
See application file for complete search history.

(56) References Cited

U.S. PATENT DOCUMENTS

| | | | |
|---|---|---|---|
| 5,619,657 A | 4/1997 | Sudama et al. | |
| 5,768,519 A | 6/1998 | Swift et al. | |
| 6,161,139 A | 12/2000 | Win et al. | |
| 6,654,779 B1 | 11/2003 | Tsuei | |
| 6,742,114 B1 | 5/2004 | Carter et al. | |
| 6,904,600 B1 | 6/2005 | James et al. | |
| 6,976,262 B1 * | 12/2005 | Davis et al. | 719/328 |
| 7,039,697 B2 | 5/2006 | Bayles | |
| 2001/0037369 A1 | 11/2001 | Joo | |
| 2002/0016814 A1 | 2/2002 | Convent et al. | |
| 2002/0112045 A1 | 8/2002 | Nirkhe et al. | |
| 2002/0128995 A1 | 9/2002 | Muntz et al. | |
| 2002/0133579 A1 | 9/2002 | Bernhardt et al. | |
| 2002/0138572 A1 | 9/2002 | Delany et al. | |
| 2002/0143773 A1 | 10/2002 | Spicer et al. | |
| 2002/0156879 A1 | 10/2002 | Delany et al. | |
| 2002/0165960 A1 | 11/2002 | Chan | |
| 2003/0115201 A1 | 6/2003 | Krishnamoorthy | |
| 2003/0120785 A1 | 6/2003 | Young | |
| 2003/0120948 A1 | 6/2003 | Schmidt et al. | |

(Continued)

FOREIGN PATENT DOCUMENTS

WO 02073926 A1 9/2002

OTHER PUBLICATIONS

Ashley et al., "Securing Networked Applications with SESAME," Linux Journal, 1998, 5 pages, vol. 1998, Issue 45es, Article No. 24, Specialized Systems Consultants, Inc., Seattle, WA.

Samar, "Unified Login with Pluggable Authentication Modules (PAM)," Conference on Computer and Communications Security, 1996, 10 pages, ACM Press, New York, NY.

(Continued)

*Primary Examiner*—T. B. Truong
(74) *Attorney, Agent, or Firm*—Senniger Powers

(57) ABSTRACT

A system and method for delegating at least one administrative duty associated with namespace management from an authentication system to at least one administration system. An application programming interface provides communication between the authentication system and the administration system. The authentication system receives a request from the administration system, verifies the authority of the request, and performs the action(s) specified in the request to manage a namespace.

44 Claims, 11 Drawing Sheets

U.S. PATENT DOCUMENTS

| | | |
|---|---|---|
| 2003/0131020 A1 | 7/2003 | Karamanolis et al. |
| 2003/0131073 A1 | 7/2003 | Lucovsky et al. |
| 2003/0131142 A1 | 7/2003 | Horvitz et al. |
| 2003/0154403 A1 | 8/2003 | Keinsley et al. |
| 2003/0163438 A1 | 8/2003 | Barnett et al. |
| 2004/0205243 A1 | 10/2004 | Hurvig et al. |
| 2005/0102354 A1 | 5/2005 | Hollenbeck et al. |

OTHER PUBLICATIONS

Morgan, "Pluggable Authentication Modules for Linux: An Implementation of a User-Authentication API," Linux Journal, 1997, 8 pages, vol. 1997, Issue 44es, Article No. 1, Specialized Systems Consultants, Inc., Seattle, WA.

Damiani et al, "Fine Grained Access Control for SOAP E-Services," The Tenth International World Wide Web Conference, 2001, pp. 504-513; ACM Press, New York, NY.

Lerner, "At the Forge: More with Three-Tiered Design," Linux Journal, 2001, 5 pages, vol. 2001, Issue 82es, Article No. 16, Specialized Systems Consultants, Inc., Seattle, WA.

Bernstein, "Middleware: A Model for Distributed System Services," Communications of the ACM, 1996, pp. 86-98, vol. 39, Issue 2, ACM Press, New York, NY.

Wobber et al., "Authentication in the Taos Operating System," ACM Transactions on Computer Systems (TOCS), 1994, pp. 3-32, vol. 12, Issue 1, ACM Press, New York, NY.

* cited by examiner

FIGURE 6

MEMBER SERVICES

CURRENT SIGN-IN NAME: JOE@A.COM

NEW SIGN-IN NAME:

PASSWORD:

SUBMIT   CANCEL

FIGURE 7

MEMBER SERVICES

CURRENT SIGN-IN NAME: JOE@A.COM

SORRY, YOUR NEW SIGN-IN NAME IS NOT VALID.
PLEASE CHOOSE A DIFFERENT SIGN-IN NAME.

NEW SIGN-IN NAME:

PASSWORD:

SUBMIT    CANCEL

MEMBER SERVICES

THE AUTHENTICATION SYSTEM HAS DETERMINED THAT THE DOMAIN PORTION OF THE ELECTRONIC MAIL ADDRESS YOU WERE USING BELONGS TO SOMEONE ELSE. IN ORDER TO CONTINUE USING THE AUTHENTICATION SYSTEM, YOU MUST CHANGE YOUR SIGN-IN.

NOTE: NONE OF YOUR PROFILE INFORMATION WILL BE AFFECTED.

CURRENT SIGN-IN NAME: JOE@A.COM

NEW SIGN-IN NAME:

PASSWORD:

SUBMIT    CANCEL

MEMBER SERVICES

THE AUTHENTICATION SYSTEM HAS DETERMINED THAT THE DOMAIN PORTION OF THE ELECTRONIC MAIL ADDRESS YOU WERE USING BELONGS TO SOMEONE ELSE. IN ORDER TO CONTINUE USING THE AUTHENTICATION SYSTEM, YOU MUST CHANGE YOUR SIGN-IN.

NOTE: NONE OF YOUR PROFILE INFORMATION WILL BE AFFECTED.

CURRENT SIGN-IN NAME:     JOE@A.COM

SORRY, YOUR NEW SIGN-IN NAME IS NOT VALID. PLEASE CHOOSE A DIFFERENT SIGN-IN NAME.

NEW SIGN-IN NAME:

PASSWORD:

SUBMIT     CANCEL

FIGURE 11

MEMBER SERVICES

CURRENT SIGN-IN NAME:   JOE@A.COM

THE AUTHENTICATION SYSTEM HAS DETERMINED THAT PART OF YOUR SIGN-IN NAME BELONGS TO A.COM. IN ORDER TO CONTINUE USING THE SAME SIGN-IN NAME, YOU MUST AGREE TO BEING MANAGED BY A.COM. IF YOU AGREE TO DO SO, THE ADMINISTRATOR OF A.COM MAY BE ABLE TO RESET YOUR PASSWORD, ALTER PARTS OF YOUR PROFILE AND FORCE YOU TO CHANGE YOUR SIGN-IN NAME AT A LATER TIME. IF YOU WORK OR BELONG TO A.COM, THIS MAY BE THE RIGHT THING FOR YOU TO DO. YOU SHOULD CONSULT THE ADMINISTRATOR OF A.COM BEFORE MAKING ANY DECISION. IF YOU ARE NOT PART OF A.COM OR YOU ARE NOT SURE ABOUT WHAT TO DO, THE AUTHENTICATION SYSTEM RECOMMENDS THAT YOU CHANGE YOUR SIGN-IN NAME. YOUR PROFILE WILL BE MAINTAINED IRRESPECTIVE OF THE CHOICE YOU MAKE.

- (●) YES, I WOULD LIKE TO MAINTAIN CONTROL OVER MY ACCOUNT BY CHANGING MY SIGN-IN NAME.

- ( ) NO, I WOULD LIKE MY ACCOUNT MANAGED BY A.COM. I ACKNOWLEDGE THAT THE ADMINISTRATOR OF A.COM MAY RESET MY PASSWORD, CHANGE MY PROFILE, OR FORCE ME TO CHANGE MY SIGN-IN NAME AT ANY TIME.

SUBMIT

US 7,330,971 B1

DELEGATED ADMINISTRATION OF NAMESPACE MANAGEMENT

CROSS-REFERENCE TO RELATED APPLICATION

This application is a continuation of prior application Ser. No. 10/044,565; filed Jan. 11, 2002.

TECHNICAL FIELD

The present invention relates to the field of authentication. In particular, this invention relates to a system and method for delegated administration of namespace management via an authentication system.

BACKGROUND OF THE INVENTION

Application service providers (ASP), Internet service providers (ISP), and the like often provide their users with a service associated with a namespace such as electronic mail. Regardless of the provider, users must be authenticated before they are allowed access to their respective e-mail accounts. For example, an e-mail provider may verify the login and password of a user before allowing the user to access his or her e-mail. One way for an e-mail provider to perform authentication is through the use of software and servers and databases associated with the provider itself. However, the e-mail provider must maintain and upgrade the authentication software, servers, and databases, which may not be cost efficient or even possible. Another way for an e-mail provider to perform authentication is through the use of a centralized, multi-site user authentication system. Unfortunately, presently available systems of this type do not permit the e-mail provider to administer or manage the numerous e-mail accounts within the namespace or other e-mail domain associated with the mail server of the provider. In other words, the e-mail provider cannot, for example, create new accounts, cancel terminated accounts, reset user passwords, and so forth with intervention by the multi-site user authentication system.

For these reasons, a system for delegated administration of namespace management is desired to address one or more of these and other disadvantages.

SUMMARY OF THE INVENTION

The invention involves standardized, generalized namespace management. In particular, the invention includes an application programming interface (API) for communication between an administration system and an authentication system. The invention also includes a method for delegating at least one administrative duty from a first system to a second system. The invention further includes an authentication system having two or more clients associated with unique namespaces. The clients have namespace administrative capabilities and a customer of one of the clients obtains a namespace identifier from the authentication system via the client. The invention provides the ability for the authentication system to manage large groups of users who have homogenous e-mail addresses.

With the present invention, an e-mail provider can use a third-party authentication system to authenticate its users. For example, the authentication system may use an e-mail address as an identifier for a particular user, also known as an e-mail as sign-in (EASI) account. The e-mail provider uses an API associated with a software development kit (SDK) for namespace management to write software that calls the interfaces that have been exposed by the invention to create accounts in a namespace without the user having to create an account (e.g., by visiting the authentication system web site). In addition, an administrator associated with the e-mail provider can reset a password on behalf of the user without the user calling the customer support staff of the authentication system. Further, an administrator can force a user to change the user's sign-in name so that the user is not identified with the e-mail provider (or client company) if the user decides that they no longer want to use the services provided by the e-mail provider.

In accordance with one aspect of the invention, an application programming interface provides communication between an administration server and an authentication server connected via a data communication network. The administration server provides a service associated with a namespace to one or more users on the data communication network. The authentication server has a database storing authentication information for authenticating the users of the namespace service. The administration server is responsive to an administrator to issue at least one request to the authentication server. The request specifies at least one action to be performed in relation to the namespace. The API includes instructions for the authentication server to receive the request from the administration server. The API also includes instructions for the authentication server to verify the authority of the administration server to issue the request received by the authentication server. The API further includes instructions for the authentication server to perform the action specified by the received, verified request.

In accordance with another aspect of the invention, a method delegates at least one administrative task from a first system to a second system. The first and second systems are connected via a data communication network. The second system provides a service associated with a namespace to one or more users on the data communication network. The method includes maintaining a database of one or more namespaces including the namespace associated with the second system. The database is maintained by the first system. The method also includes the first system receiving a call from the second system. The call provides a request that at least one routine be performed to implement a desired administrative task for managing the database. The method also includes the first system executing the routine in response to the call received from the second system to implement the administrative task. In one embodiment, the first system is a multi-site user authentication system and the second system is an affiliate. For example, the second system may be an application service provider (ASP), an Internet service provider (ISP), a namespace owner (NSO), or a namespace provisioning (NSP) partner.

In accordance with another aspect of the invention, a computer-readable medium has computer-executable components for delegating at least one administrative task from an authentication system to at least one administration system. The authentication system and the administration system are connected via a data communication network. The administration system provides a service associated with a namespace to one or more users on the data communication network. The components include an identifier component, an interface component, and an operation component. The identifier component maintains a database of one or more namespaces. The database is maintained by the authentication system. The users may have accounts with the authentication system, and each account has an identifier using one of the namespaces. The interface component allows the authentication system to receive a call from the administration system. The call provides a request that at least one routine be performed to implement a desired administrative task for managing the database. The operation component allows for the authentication system to execute the routine in response to the call received from the administration system to implement the administrative task.

In accordance with another aspect of the invention, a system authenticates at least one user of a namespace service. The system includes one or more user databases storing authentication information. The system also includes an authentication server for communicating with the database via a data communication network. The system also includes an administration server for communicating with the authentication server via the data communication network. The administration server provides the namespace service. The administration server is responsive to an administrator for issuing at least one request to said authentication server. The request specifies at least one action to be performed in relation to the namespace service.

Alternatively, the invention may comprise various other methods and apparatuses.

Other features will be in part apparent and in part pointed out hereinafter.

BRIEF DESCRIPTION OF THE DRAWINGS

FIG. 6 is an exemplary user interface for changing the sign-in of a user.

FIG. 7 is an exemplary user interface displaying an error response when changing the sign-in of a user.

FIG. 9 is an exemplary user interface for forcing a user to change a sign-in.

FIG. 10 is an exemplary user interface displaying an error response when forcing a user to change a sign-in.

FIG. 11 is an exemplary user interface for obtaining consent from a user to be managed.

Corresponding reference characters indicate corresponding parts throughout the drawings.

BRIEF DESCRIPTION OF THE APPENDICES

Appendix A includes exemplary error codes generated by the invention.

Appendix B includes exemplary SOAP-based interfaces implementing the invention.

Appendix C includes exemplary scenarios employing the invention.

DETAILED DESCRIPTION OF THE INVENTION

The invention includes functionality that enables an administrator in an organization to, among other administrative duties or tasks, create authentication system accounts on behalf of other users in the same organization using a third-party authentication system. In this invention, the organization is an affiliate or partner to the authentication system. Most or all account administration functions can be performed by the administrator of that affiliate. In other words, the authority to administer the accounts is "delegated" to an entity other than the individual user and other than the authentication system.

Generally, the invention provides for delegated administration of namespaces or other domains. An affiliate may want to manage a single namespace or multiple namespaces. For example, an affiliate may be a namespace owner (NSO) or other large organization that wants to reserve a single namespace. An NSO generally wants exclusive control of its namespace but may not want to reserve more than a single namespace. For example, an affiliate such as Company A may want to reserve the namespace A.com. In contrast, a namespace provisioning partner (NSP) has the authority to provision or otherwise reserve a namespace within the authentication system namespace. An example of an NSO would be any Internet service provider (ISP).

Those skilled in the art will note that the exemplary namespaces A.com, B.com, and C.com used herein are fictitious and any similarity to actual namespaces is purely coincidental and unintentional.

The authentication system maintains a list of the managed namespaces or other namespaces that are "owned" by an NSP or NSO with delegated administration rights. The authentication system also maintains a list of the managed accounts or other accounts that can be administered by an NSP or NSO and a list of managed users or other users with managed accounts. Each account has an identifier using the namespace associated with the NSP or NSO. An account that is inside a managed namespace is a necessary but not sufficient condition for an account to be managed. In one embodiment, some users of the authentication system may have an authentication system account that is not in a managed namespace. Further, those skilled in the art will note that it is possible to have an unmanaged account inside a managed namespace.

Figure 1:
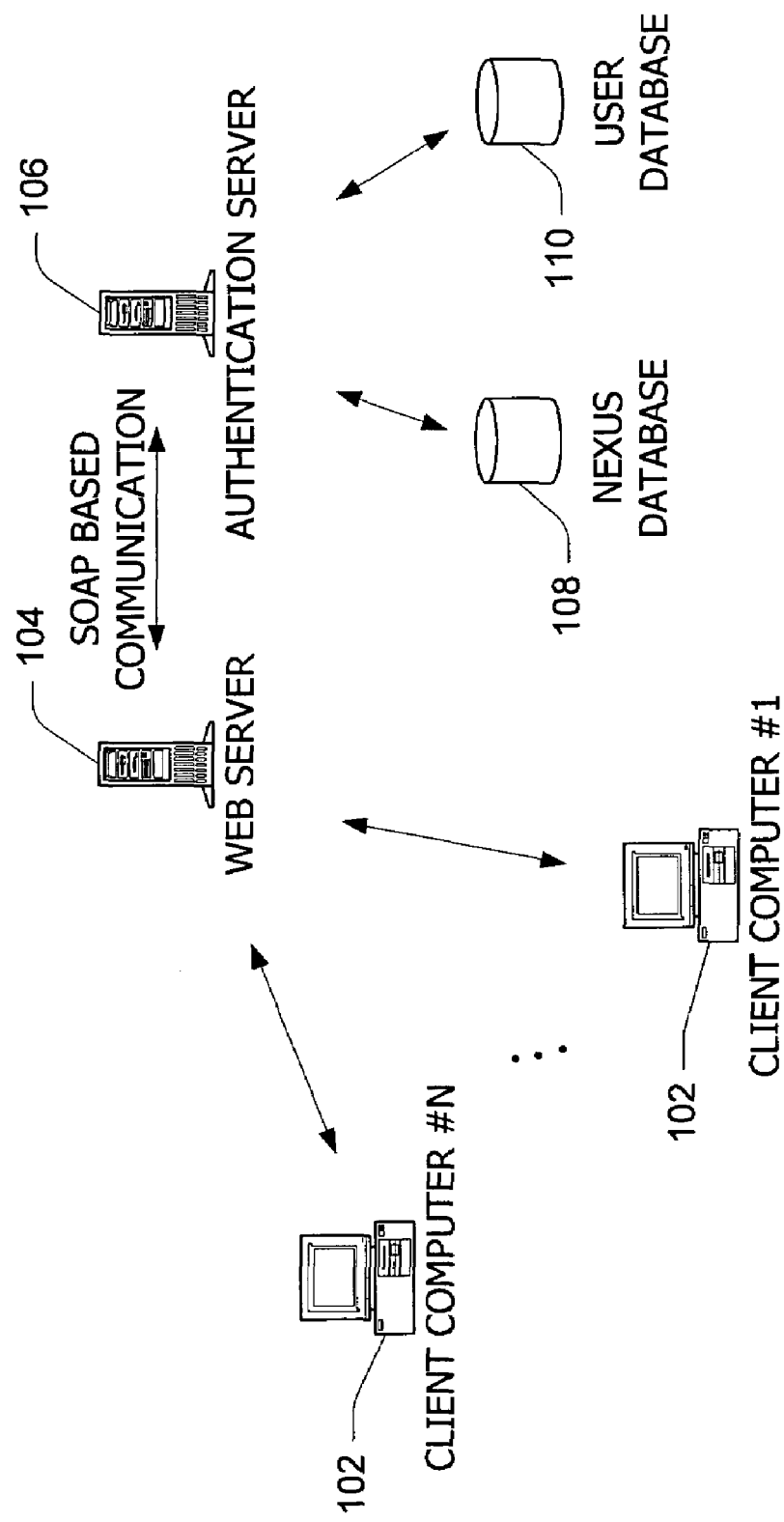
FIG. 1 is a block diagram of one embodiment of the invention illustrating communication flow between components of the invention.

Referring first to FIG. 1, a block diagram illustrates the communication flow between components of the invention according to the invention. One or more client computers 102 such as client computer #1 through client computer #N connect to a web server 104 associated with an ASP. The web server 104 connects to an authentication server 106. The web server 104 and the authentication server 106 communicate via requests such as, for example, simple object access protocol (SOAP) requests. Authentication server 106 stores and executes delegated administration software implementing the invention. Authentication server 106 also has access to a nexus database 108 and a user information database 110. The nexus database 108 stores information including, but not limited to, uniform resource locators and other site information, an affiliate list, namespaces, and the location of the user information database(s) 110 that store the user information. The nexus database 108 also keeps record of some attributes of an affiliate web site or other web site that uses the authentication system. For example, computer-based services, such as web portals, instant messaging, e-mail, and the like, often require routing the user to one or more collaborating affiliate web sites to obtain desired services. Each site may require user authentication. In this regard, a multi-site user authentication system beneficially provides a central site for registration. Nexus database 108 stores information regarding each affiliate that has registered or otherwise established a relationship or affiliation with the authentication system. In another embodiment, authentication server 106 has access to a plurality of user information databases 110. It is to be understood that authentication server 106 may include multiple servers. Alternatively, all the databases and servers associated with the authentication system may be stored on one computer.

The invention exposes the concept of administrators to manage namespaces. There must be at least one administrator for a given namespace. As such, the last administrator cannot be removed unless the namespace is de-reserved or no longer managed. There is no limit to the number of administrators that may administer a namespace. An administrator may perform tasks including, but not limited to, releasing namespaces, creating user accounts, removing users from a namespace, resetting passwords on behalf of users, and promoting users to being administrators or demoting administrators to being users.

In one embodiment, there are two types of administrators: a namespace administrator and an affiliate administrator. A namespace administrator is a special case of a managed user that has special rights over other managed users. In particular, a namespace administrator has the ability to manage a single namespace and generally does not have an account with the authentication system prior to reservation of the namespace (see below). After reservation of the namespace, a namespace administrator has a user name in the managed domain. If a user account in the authentication system with the desired namespace administrator name already exists in the namespace, the user is forced to rename the account (see below). However, a namespace administrator cannot delete an affiliate administrator.

A partner administrator or other affiliate administrator (e.g., belonging to an NSP or NSO) has the ability to administer one or more namespaces. An affiliate administrator has more privileges than a namespace administrator. While an affiliate administrator already has an account with the authentication system, the affiliate administrator does not need to have an account in the namespaces he/she administers. An affiliate administrator has a user name in a domain associated with the affiliate and has full control over the namespace including the ability to revoke the rights of a namespace administrator. Creating an affiliate administrator allows the NSP to effectively allow administration of a namespace if a namespace administrator forgets his/her password or is otherwise unavailable. Further, an NSP designates one or more affiliate administrators so that the NSP does not need to create an administrator account in every namespace that the NSP manages.

The invention exposes a set of APIs that allows affiliates or other administrators to effectively manage their namespace. For example, the set of APIs may be routines such as NameSpaceReserveRequest, NameSpaceReleaseRequest, NameSpaceSignupRequest, NameSpaceResetPasswordRequest, NameSpaceEditAdminListRequest, and NameSpaceRemoveMemberRequest. Those skilled in the art will note that the above API set for delegated administration of namespace management is merely exemplary, and that other routines that are not detailed herein yet directed to namespace management are within the scope of the invention. If any of the APIs described or contemplated herein generate an error, an error response will be sent to the affiliate or other administrator calling the API.

An application service provider (ASP) or other affiliate that offers an application as a service (e.g., e-mail, calendar, etc.) is one example of an affiliate that benefits from the functionality provided by the invention. An ASP provides a "one-stop shop" for many of the services that a small business might need such as e-mail, web hosting, fax assistance, or collaborative workspaces. Most ASPs target the millions of small businesses who do not have the expertise, manpower and the finances to build their own information technology infrastructure. As part of the services that they are selling to small businesses, the ASPs would like to "sell" the authentication system to its customers thus achieving the dual goals of (i) outsourcing authentication and (ii) providing some value to its end users in that they will be able to use their authentication system accounts at other sites on the web. The needs of an ASP are much like that of an Internet Service Provider (ISP) in that once an organization signs up to use the ASP's service, the ASP would like to "own" the namespace that they are managing. For example, all users of the ASP's services have accounts with the authentication system and no user can sign up with the authentication system with an identifier using the namespace associated with the ASP without going through the ASP.

An Internet service provider (ISP) is another example of an affiliate that benefits from the functionality provided by the invention. An ISP would like to achieve some control over the namespace that they own in terms of account ownership. For example, it is conceivable that an ISP may want to use authentication system for authentication of all its users. The authentication system can "delegate" these administrative functions to the true owner of the namespace, which is the ISP in this example. With the invention, the ISP can perform various tasks including, but not limited to, creating and deleting accounts as they see fit, recycling names as its member base changes over time, and resetting a user's password if needed. There are numerous other tasks that an ISP can perform to manage a namespace. While such tasks are not specifically detailed herein, those skilled in the art will note that such tasks are within the scope of the invention.

In one embodiment, the invention may support more than one or two million users over one or two years. Further, all transactions may occur over a secure connection such as according to a secure socket layer (SSL) protocol. While the API of the invention may be implemented using SOAP-based XML routines, alternatively, other transport mechanisms may be used in the implementation. In addition, some APIs may support alternate credentials for authentication. For example, these APIs may include registration, resetting a password, deleting an alternate credential from an authentication system account, and changing an alternate credential name.

In one exemplary embodiment of the invention, Company A is an application service provider or Internet service provider and provides its users with electronic mail accounts. Company A would like to start using the authentication system of the invention to authenticate Company A users. Company A would like the ability for its administrator to create accounts without the users visiting the authentication system web site every time. The customer support staff of Company A would also like to reset the passwords of the users if needed without the user calling the authentication system customer support. If a user cancels service, Company A would like the user to change the user's authentication system sign-in name to a sign-in name that does not identify the user with Company A. Company A can use the SDK for namespace management and use the SOAP-based API to write software that will be able to call the interfaces that have been exposed by the invention to create accounts in a namespace without the user having to create an account for himself. In addition, the software allows an administrator within the Company A to reset a password on behalf of the user if the user has forgotten the details that are needed to reset password. Further, if the user decides that they no longer want to use the services provided by Company A, the administrator can force the user to change the user's sign-in name so that the user is not identified with Company A.

An exemplary operating environment for the invention is next described.

Operating Environment

Figure 2:
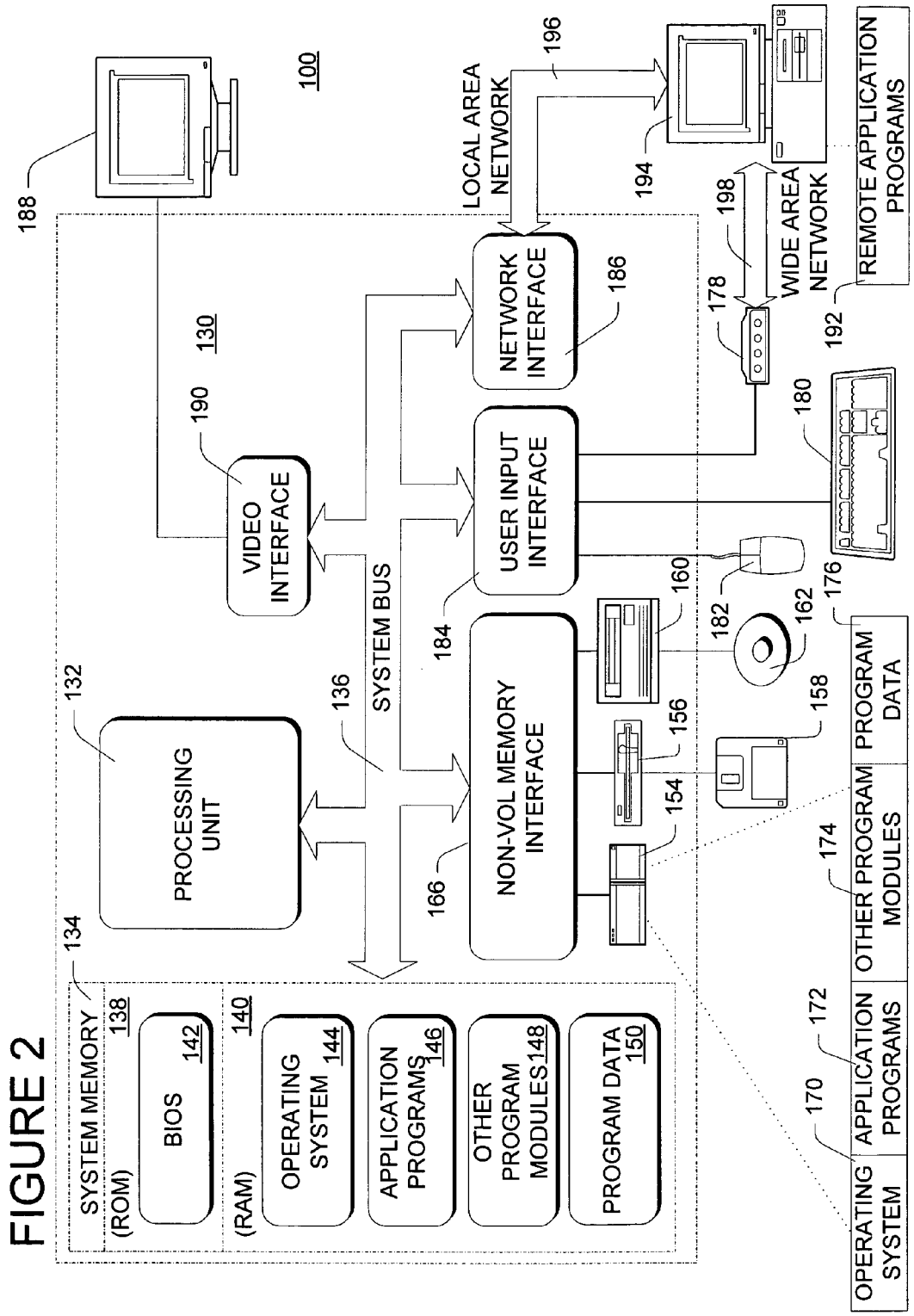
FIG. 2 is a block diagram of one embodiment of the invention illustrating one example of a suitable computing system environment on which the invention may be implemented.

FIG. 2 shows one example of a general purpose computing device in the form of a computer 130. In one embodiment of the invention, a computer such as the computer 130 is suitable for use in the other figures illustrated and described herein. For example, a computer such as the computer 130 is suitable for use as computer 82.

Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 2 illustrates operating system 144, application programs 146, other program modules 148, and program data 150.

The computer 130 may also include other removable/non-removable, volatile/nonvolatile computer storage media. For example, FIG. 2 illustrates a hard disk drive 154 that reads from or writes to non-removable, nonvolatile magnetic media. FIG. 2 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 144, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 2, provide storage of computer readable instructions, data structures, program modules and other data for the computer 130. In FIG. 2, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 2 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 194, or other appropriate mechanism. In a networked environment, program modules depicted relative to computer 130, or portions thereof, may be stored in a remote memory storage device (not shown). By way of example, and not limitation, FIG. 2 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Figure 3:
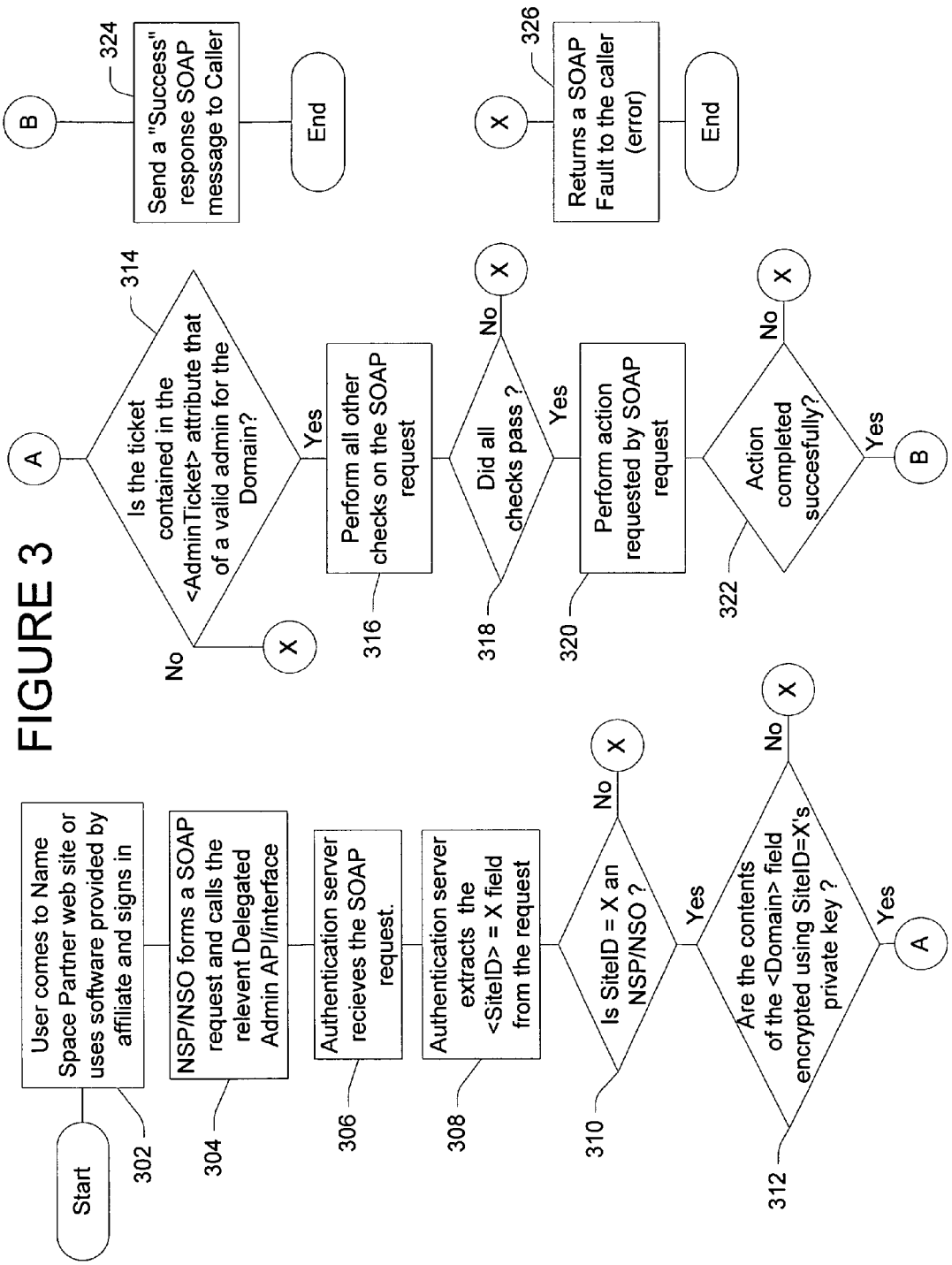
FIG. 3 is an exemplary flow chart illustrating operation of an application programming interface (API) function call.

Referring next to FIG. 3, a flow chart illustrates operation of an API call. A user visits a web site of an affiliate at 302 or uses software provided the affiliate to sign in and manage a namespace. The affiliate forms a request at 304 and calls the appropriate API. An authentication server (such as authentication server 106) receives the request at 306 and verifies the request. Verification includes extracting a site identification attribute value from the request at 308 and verifying the status of the calling site as an affiliate at 310. The authentication server further verifies at 312 that the domain information has been encrypted using the affiliate's private key. In addition, the authentication server extracts an administrator attribute value and verifies that the administrator is a valid administrator for the domain at 314. The authentication server may also perform various other checks on the request at 316. If the verifications and checks pass at 318, the authentication server performs the action(s) specified in the request at 320. If execution of all the actions succeeds at 322, a success response is sent to the caller at 324. If execution of any of the verifications, checks, or actions fail, an error response is returned to the caller at 326.

An affiliate or other privileged administrator uses the API routines detailed herein and any other API routine relating to namespace management not detailed herein yet contemplated by the invention to control or otherwise administer a namespace.

Each of the exemplary API routines is next described.

Reserving a Namespace

An affiliate or any other company that wants to start using the authentication system for their authentication needs can request to reserve a namespace. In one example, the affiliate physically owns the namespace they would like to control but they need to reserve this namespace within the authentication system realm. The affiliate requests to manage the namespace via an API call such as a NameSpaceReserveRequest SOAP request. In one embodiment, the request provides the affiliate name, the electronic mail address of the initial administrator, and the name of the requested domain. When the request is received, the authentication system verifies that the affiliate is authorized to administer the namespace. In one embodiment, the authentication system (including authentication server 106 and databases 108, 110) verifies authorization by performing a namespace lookup (e.g., NSLookup) to obtain the mail exchange (MX) records for the domain. If an MX record is found specifying the affiliate's domain pointing to the NSP, the authentication system assumes that the affiliate is authorized to reserve the namespace. Generally, the request to provision a namespace will not be made until the time the MX record is owned and that an affiliate's claim to ownership of a namespace will be determined by doing the equivalent of an NSLookup. If the MX record does not point to the correct location, an error will be returned.

In this embodiment, the authentication system trusts the affiliate to only request reservations for domains for which the affiliate has received permission to reserve. The authentication system may include contractual language stating this assumption. Those skilled in the art will note that other means of verifying the authority of an affiliate to reserve a namespace may be performed, and that such means are within the scope of the invention.

To reserve the namespace, an entry is made into the nexus database 108 such as in FIG. 1. The entry allows the authentication system to know that the affiliate-requested namespace is reserved and that users cannot go to the authentication system web site and register with accounts using the reserved namespace.

In one example, an ASP provides electronic mail services for small companies. The ASP has a business arrangement with the authentication system. The authentication system operations personnel add the name of the ASP to the nexus database 108 that instructs the authentication system to treat requests coming from the ASP in a special manner. A small company such as Company A goes to the ASP web site and decides to register for electronic mail services and reserve A.com. When Company A goes to the ASP web site and registers its name for electronic mail services, the ASP web page runs software that calls an API (e.g., NameSpaceReserveRequest) exposed by the invention. In this example, web server 104 associated with the affiliate serves the ASP web site to Company A at one of the client computers 102 via a data communication network such as the Internet. When authentication server 106 receives this request, the authentication system verifies that the caller of the API has the privilege to make this call by checking nexus database 108 associated with the authentication system. Once this is verified, authentication server 106 needs to verify if the request is indeed coming from the ASP who has this privilege.

In the SOAP-based embodiment, the authentication system examines the SOAP-based request and checks to see if the <Domain> tag encrypts the information in the ASP's private key. If the verification succeeds, authentication server 106 then makes a call to domain name service (DNS) servers to verify that the ASP actually has the privilege to reserve the namespace (i.e., whether Company A gave the ASP permission to reserve the namespace on its behalf). The authentication system then makes an entry in the nexus database 108 that records the namespace A.com as being reserved.

At this point, once A.com is finished with the sign-up process with the ASP the namespace "A.com" has been reserved. User registration on the authentication system web site for this namespace is blocked and a success response is sent to the caller (in this case, the ASP). This means that no one can go to the authentication system web site and register for an account such as user@A.com.

Once the namespace has been reserved, at least one administrator account is created for the namespace to ensure that there is at least one administrator for every reserved namespace. In one embodiment, at least two people are given administrative powers over the namespace: an affiliate administrator and a namespace administrator. In some cases, the proposed administrator already has an account in the namespace that they are reserving. If this happens, the sign-in name of the account may be specified without a password. If the administrator account for the namespace is already taken, a force change sign-in name will be enforced on the pre-existing account to "evict" a user associated with the pre-existing account. After the namespace has been reserved, if someone else has an existing identifier with a specific namespace, this person can be evicted from the namespace (see below).

The request to reserve a namespace contains an authorization header that allows an affiliate to identify itself uniquely to authentication system. In the SOAP-based embodiment, the <Admin> section of the request contains the profile attributes needed to create an administrator account. The tags contained within the <Admin> section are similar to that for registration of an individual account (see below). If the request to reserve a namespace is successful and the administrator account is successfully created, authentication server 106 sends a response to the caller. The <UID> tag is the unique user identification (UID) of the newly created account (the namespace administrator). If the request to reserve the namespace fails, then an error response is sent to the caller.

An NSO performs similar steps to reserve a namespace. That is, the NSO calls the NameSpaceReserveRequest API in addition to having an entry in the nexus database 108 for the domain name (namespace). The NSO also has a business agreement with the authentication system that ensures that there is an entry for this NSO in the nexus database 108 and that only the NSO can create accounts in the namespace from the time the agreement was signed. The NSO generally does not want to reserve any namespaces other than its name, brand, or product.

No manual intervention is required for the request to reserve a namespace. Further, in an exemplary embodiment, there are certain namespaces that cannot be reserved. In addition, the affiliate can also provision separate domains for localized versions of the namespace (e.g., A.au).

Releasing a Namespace

An affiliate or any other company that was previously using the authentication system may decide to stop using the service. That is, the affiliate does not want to continue using the authentication system for its authentication needs. The privileged administrator (affiliate or namespace) calls the NameSpaceReleaseRequest API function call to cancel the control of the namespace, but not the accounts themselves. The authentication system removes the tag indicating "special affiliate." If the administrator was a namespace administrator, the administrator is now a normal, regular authentication system user.

Operations personnel associated with the authentication system remove the entry for the affiliate from nexus database 108 to release the namespace. The namespace is now open for account creation in that user registration on the authentication system web site for this namespace is no longer blocked. All the existing users in this namespace continue using their accounts as before. That is, once a namespace has been released, none of the accounts in that namespace will be deleted. Any standard "age-out" policy can be applied to all accounts in the namespace such that the timer for the age out starts at the time the namespace was released. In the SOAP-based embodiment, when a request to release a namespace is received, all accounts in that namespace will have the IsManaged property reset to FALSE.

In an alternative embodiment, depending on the business agreement that was in place between the affiliate and the authentication system, the user accounts that were created for this affiliate may be given special treatment. Whether the authentication system allows someone to register on the authentication system web site in this namespace may also depend on the business agreement.

The following example illustrates releasing a namespace. Company A has been using services hosted by the ASP but decides that it no longer needs these services. The ASP needs to inform the authentication system that the namespace A.com needs to be released. The administrator for A.com goes to the ASP web page and lets the ASP service know that Company A would like to cancel its service with the ASP. When the administrator for A.com asks to release the namespace, the web page executes code that sends a call (e.g., NameSpaceReleaseRequest) to authentication server 106.

As in the case of reserving a namespace, authentication server 106 first checks the identity of the caller by decrypting the information that is encrypted in the private key of the caller. Authentication server 106 then verifies that the caller is privileged to release this namespace. In addition to making these calls, authentication server 106 also verifies that the person from A.com who has asked to release this namespace has administrator privileges. If all the verifications succeed, authentication server 106 removes the namespace from the list of reserved namespace and new users can now freely register accounts such as user@A.com on the authentication system web site. Existing users are not affected by the change. If the operation completes successfully, a success response is sent to the caller. If there is a problem with the request to release, the caller will get an error response or "fault."

In one embodiment, the list of namespaces maintained by the authentication system is cached in order to improve performance. If a namespace is released, it may not be possible to freely register into the namespace for some time period (e.g., twenty-four hours). In alternative embodiments, the releasing of a namespace is completed instantaneously or in real-time.

As with an affiliate reserving a namespace, an affiliate releasing a namespace can be completed manually by authentication system personnel or by the use of the API call.

Creating User Accounts in a Namespace

An affiliate or other privileged administrator can add accounts to a managed namespace. The affiliate writes code to call an API that creates authentication system accounts. When authentication server 106 receives the request, authentication server 106 performs a check to verify that the affiliate calling is a valid affiliate and that the administrator requesting the operation is privileged to perform this operation. If all verifications succeed, a new account is created and a UID associated with the new account is returned to the administrator associated with the affiliate. In one embodiment, only a designated administrator can create the accounts. The ticket (possibly encrypted) identifies the administrator.

For example, after reserving a namespace, Company A would like to create authentication system accounts. Company A would like to do this programmatically without asking all its users to go to the authentication system web site and individually register for accounts. For example, when an administrator for Company A comes to an ASP web site and requests to create accounts in the namespace, the ASP web site executes code that calls an API (e.g., NameSpaceSignupRequest).

If an account is successfully created, a response is sent to the caller. The response has the UID of the newly created account. This behavior is slightly different from registration where the UID is sent to the affiliate as part of the profile cookie. In this case, because the administrator is creating the account on behalf of the user, the user cannot be logged in and the affiliate will ultimately need to make a call to get the UID. As such, the UID is returned as part of a success response.

If there is a problem encountered with creating an account, a SOAP response with the error is sent to the caller. For example, if there is an existing account with the same name, an error will be returned to the caller. In this situation, if the administrator still wants to use this name, they will need to use the NameSpaceRemoveMemberRequest interface to evict the pre-existing user from the namespace and then attempt the registration again. In another example, for a managed namespace, if an NSP desired to create an authentication system account for a user, it may happen that the account name is already taken. This may be because the user already created an authentication system account on his own by going to the authentication system web pages, or because an old user owns the account name (the old user may or may not have previously worked for the affiliate).

In the SOAP-based embodiment, the presence of the authorization node or tag distinguishes this signup request from the signup request for unmanaged accounts. It is expected that the affiliate will have an affiliate ID that they can use to fill the contents of the <Authorization> header. If the affiliate ID matches that of an affiliate that is authorized to manage namespaces, then for every account that is created is marked that it is managed. Validation and welcome mail will be suppressed if the request is received from a valid NSO. The profile elements that are required for registration are specified in a file specified by the affiliate during the site provisioning process (i.e., during reservation of the namespace). It is to be understood that all attributes that are part of an account profile can be supplied when creating accounts.

When creating accounts, most NSPs would like the ability to suppress electronic mail validation. In addition, most NSPs would like to suppress the welcome mail for accounts they provisioned and instead send out their own mail as needed. This behavior is enabled by default for all Name Space partners. Further, most NSPs do not want any account they create to "age-out" since the accounts represent a source of revenue. No "e-mail as sign-in" (EASI) account is off limits for an NSP if the namespace is reserved by the NSP. This means that no account names should be constrained by a "forbidden words" list. During the provisioning process, every NSP/NSO is given the following options:

i) Apply a 'forbidden words' list? Default=NO
    ii) Allow change sign-in name? Default=NO
    iii) Send validation mail? Default=NO
    iv) Send welcome mail? Default=NO
    v) Apply some form of age-out to accounts? Default=NO
    vi) Other options are possible.

The NSP marks the registration in a way such that the authentication system is able to recognize the originator of the request (may be by signing the request, encrypting in affiliate's NSP's key, etc.). The account is also marked as "validated" if e-mail is being provisioned by the NSP.

Removing User Accounts from a Namespace

An affiliate or other privileged administrator removes user accounts from a managed namespace. At any time after the domain is marked as managed, the affiliate may issue a <NameSpaceRemoveMemberRequest> XML request specifying the names of all unauthorized users that are to be removed from the managed namespace. Note that this does not remove the member account; it does, however, force the member account to be renamed to one not in the namespace the next time the member logs on. This mechanism is essentially the same as that used for "hijacked" user names. Removing user accounts from a namespace is also referred to as eviction.

For example, one of the users (Joe@A.com) leaves Company A or is fired. Company A needs a way to decouple the sign-in name of that account from the UID of the authentication system since the name represents Company A. In order to do this, when the administrator of A.com goes to the ASP web site, they indicate a desire to "evict" a user from a namespace using the user interface provided by that web site. The web site executes case which calls a SOAP-based API to "evict" a user from the namespace. When authentication server 106 received the request, it performs the checks to verify that the caller and the administrator have the privilege to perform this operation. If the verification succeeds, the user's account is marked for eviction and the user will be forced to change sign-in name the next time he/she logs in. Only the sign-in name is changed, not any of the other account details. The user's profile information is preserved in this process. The authentication system will process the remove user request and send back a response if the user is removed. If an error occurs, an error response will be sent.

In one embodiment, the affiliate obtains a list of users in a namespace via the "enumerate users request" (see below). Once an affiliate has a list of users in a namespace, the affiliate has the ability to decide which users to evict from the namespace. Further, an AdminTicket element includes the encrypted ticket of the administrator making the request. Alternatively, the AdminTicket element includes the clock skew, allowing expiration of tickets in a sufficiently short time to avoid replay attacks.

Accounts that are created by an NSP or an NSO will not be subject to an age-out while the accounts stay in a "managed" state. That is, the accounts will not be automatically removed after a specified period of inactivity. Alternatively, accounts may be aged out if they have not been initially used for a certain number of days (e.g., 10 days) or if the account has not been used for a certain number of days (e.g., 90 days).

Enumerating Administrators for a Namespace

Further, once a namespace has been reserved, authorized administrators can query the nexus database 108 to enumerate all the administrators to see who else can administer the namespace. The administrator goes to a web site and uses a user interface which in turn executes code that calls an API call to enumerate all the administrators in a given namespace. Since there are two types of administrators, the API call may specify which group it wants (Namespace, Affiliate or Both). You can list all administrators for the namespace or only those of a certain type. The TYPE keyword lists the type of administrators requested: a namespace administrator or an affiliate administrator. The <Type> field may have three possible values including NAMESPACE to enumerate namespace administrators, AFFILIATE to enumerate affiliate administrators, or BOTH to enumerate both classes of administrators. The authentication system receives the request and check if the request is valid (i.e. from a valid NSP and administrator). If the response is valid, authentication server 106 sends the caller a list of administrators for the namespace. The <Name> elements may not returned in any meaningful order. If there is a problem with processing the request, an error response is sent to the caller.

Editing a Namespace Administrator List

As detailed herein, the authentication system maintains a list of administrators that have control over a namespace. Further interfaces support the ability for NSPs to add and remove administrators from the list of administrators who can control a namespace. Once a namespace has been reserved, an administrator adds or deletes other administrators as they see fit in a namespace the administrator controls. Only an administrator for the namespace can perform this operation.

In one embodiment, one action can be attempted per request: either an ADD or a DELETE. However, any number of administrative functions may be processed through a single API call (e.g., add several administrators or delete several administrators). Similarly, any number of administrative functions may be processed through a single API call for the other API function calls detailed herein (e.g., reserve multiple namespaces or create multiple user accounts).

For example, when an administrator from A.com wants to add or remove an administrator from the list of administrators, the administrator visits a web site (e.g., hosted by an ASP) and uses a user interface (UI) to perform the action. The web page executes code that calls an API call that requests authentication server 106 to add or delete administrators for the namespace. If the administrator who requested the operation is authorized to perform such an operation and the namespace is validated to be owned by the affiliate, the request is processed and a response is sent to the server requesting the operation. If the request to process the administrator cannot be processed due to some error, an error response is sent.

One or more administrators may be added or removed from the administrator list. Administrators with credential names in the specified managed domain are considered domain administrators or namespace administrators, while administrators with credential names in the affiliate's domain are considered affiliate administrators. Namespace administrators cannot delete affiliate administrators. The administrator generating the request must have administrator rights to the namespace. The administrator generating the request cannot remove itself from an administrator list via a request in which the administrator is the authorizing administrator. An affiliate administrator may remove a namespace administrator. At the end of the operation, there must be at least one affiliate administrator left who is authorized to administer the namespace.

The authentication system receives the request and performs operations including, but not limited to, decrypting the name of the namespace from the <NameSpace> tag by looking at the affiliate ID and validating whether the affiliate has rights to this namespace, looking up the administrator specified in the <AdminTicket> tag and checking if this account exists and has administrator rights to the namespace, and checking if the administrator that is being added is part of the namespace or part of the affiliate namespace. If there are no problems with the above steps, the name of the administrator in the request is examined to check if the account exists in the namespace. If so, the administrator is added or deleted from the list. If an add operation is requested on an account that is already an administrator account, then no action is needed. If a remove operation is requested on an administrator account that is not on the list, no action is needed.

Listing User Accounts Associated with a Namespace

An affiliate or other privileged administrator can request a list of all accounts associated with a namespace. Such a request is also known as enumerating users in a namespace or "capturing" accounts. The <NameSpaceEnumerateRequest> interface can be used to enumerate the users in a namespace. In response, the authentication system will return a list of users in the namespace after checking for proper authorization. If the request to enumerate users cannot be processed due to an error, an error response will be sent to the affiliate.

Resetting a Namespace Password

An interface allows an administrator to reset a user's password. In order for a user's password to be reset by this mechanism, the user must be managed. Further, the administrator must be logged in for the authentication system to perform an authorization check.

In the SOAP-based embodiment, the <User> tag contains the user's sign-in name. The <Password> tag contains the new password. If the attempt to reset a password succeeds, a response indicating such is sent to the requester. If the request to reset a password fails, an error response is sent to the requester.

In the case of an NSO, in order to reset a user's password, NSOs will need to write their own tools that use the NameSpaceResetPasswordResponse interface. They will already have a site ID that they can use to fill the contents of the <Authorization> header. The NSP can send a signed request to be able to reset a user's password that belonged to a namespace that was managed by the NSP or NSO. The request does not need account information such as the country, region, zip information, a secret answer, or credit card information.

Users can be forced to change passwords at first login or every time an affiliate (NSO/NSP) changes or handles the password.

Updating a User Profile

An affiliate or other privileged administrator managing a namespace may modify a user's profile via an update profile interface. The updated interface allows, for example, the flags in a user's profile, the last name of the user, or any other element of the user's profile to be modified.

Authorization for affiliates to change flags will be done, for example, by setting a tag in the nexus database 108 called <AllowProtectedUpdates>. This tag is a bit field that represents which flags an affiliate has access to. There is one bit in the bit field for every flag. If a bit is set for a certain affiliate, then the affiliate has permission to modify the flag.

In other words, in the exemplary update interface, a <Flags> tag allows an affiliate to change the flags on a user's profile. The affiliate who controls a namespace enters a bit mask of flags that they wish to apply to the profile. Similarly, for example, a <LastName> tag allows an affiliate to change the last name of a user. In addition, an <Authorization> header allows the affiliate to authorize the affiliate to the authentication server(s). This means that a user does not have to be logged in to change his own profile, rather, the administrator can change it for the user. If the request to update a user's profile succeeds, an XML response is sent to the caller.

An affiliate can also view a user's profile prior to updating the profile by generating a get profile request to retrieve the flags or any other element in a user's profile.

Deleting a User Account

An affiliate or other privileged administrator managing a namespace can delete an authentication system account of a user in the namespace to re-claim the account if the user leaves an organization. In such a case, the user might have privileges at affiliate sites based on the user's sign-in name as well as UID.

The NSP site executes software that enables the NSP to encrypt/de-crypt any information in the affiliate's key. The authentication system maintains authorization data for all administrators that have special rights. A table exists in the nexus database 108 with attributes including, but not limited to, the name of the namespace, the site ID of the NSP controlling the namespace, and a list of administrator accounts that can administer the namespace. The following table provides example attribute values.

| Name | Controlling Affiliate ID | Administrators |
|---|---|---|
| A.com | 2427 | Admin@A.com, Joe@A.com |
| B.com | 1234 | John@B.com, Sally@B.com |
| C.com | 1234 | Fred@C.com |

In one embodiment, an NSP has a single affiliate site ID and the small business organizations that sign up for the NSP's service will not have affiliate IDs. All accounts that are managed by an administrator have a property "IsManaged" set to TRUE. All SOAP requests/responses will be sent over SSL. The interfaces of the invention can be for server consumption and therefore include an authorization header that will allow the server to uniquely identify the affiliate who is calling the interface. All SOAP requests have an <Authorization> header that allows the sender to be authorized. This header includes the name of the namespace encrypted in the affiliate's key and the administrator ticket making the request. The fact that the namespace being operated on is encrypted insures against replay attacks since a timestamp is taken into account while encrypting. An exemplary header appears as follows.

```
<Authorization>
        <NameSpace ID={X}>EncryptedkeyX{A.com}</NameSpace>
        <AdminTicket>EncryptedkeyX{ticket}</AdminTicket>
</Authorization>
```

Each user in a "managed" namespace can edit a profile on the member services page hosted by the authentication system, change a password on the member services page, and reset a password on the member services page if the user has the details needed to reset the password. Each user can not change a sign-in name on the member services page or change other credentials if signed in with a different set of credentials.

Each namespace administrator has an account in the namespace that are going to manage and can do everything a normal user can do except edit a user's profile. For example, each namespace administrator can create accounts for users in that namespace, grant a user in that namespace administrator rights in that namespace, revoke another namespace administrators rights, and reset passwords for users as well as other administrators in the namespace without having to know the secret question and answer. However, a namespace administrator can not, for example, change any credentials (sign-in name, phone number etc.), change administrators sign-in name, or add/delete affiliate administrators from the list of administrators.

Each affiliate administrator has an account in the namespace specified in the <DomainName> tag specified in the nexus database 108 and can do everything that a namespace administrator can do including, but not limited to, adding or deleting namespace administrators to the list of administrators.

Becoming an NSP

In one embodiment, the process to make an NSP is manual (e.g. by means of a business agreement). Once an affiliate has been deemed an NSP, they will be assigned a site ID and there will be an entry in the nexus database 108 for them.

Two tags in the nexus database 108, <NameSpaceAffiliate> and <DomainName>, mark the affiliate as an NSP. Valid values for <NameSpaceAffiliate> tag are 1 to indicate that the affiliate is an NSP. Any other values or a missing tag will be equated to having a 0 to indicate that the affiliate is not an NSP. This tag is optional for all affiliates (i.e. if the tag is missing for an affiliate, is assumed that the value of this tag is 0).

An NSP provisions or otherwise creates a namespace, reserves a namespace that they have created, releases a namespace that they have reserved, creates accounts in a namespace they have created, and resets passwords for user accounts they have created in the namespace that they have created.

The <NameSpaceAffiliate> tag must be present in order for the <DomainName> tag to be respected. If the <NameSpaceAffiliate> tag is not present, the <DomainName> tag will be ignored. If the <NameSpaceAffiliate> tag is present, but there is no <DomainName> tag, an error will be returned. Affiliate administrators must be part of the namespace specified in the <DomainName> tag.

In one embodiment, the URL for affiliates to locate this service will be in the Affiliates.XML file specified by a <DelegatedAdmin> tag. Such a tag may have the value https://delegatedadmin.authenticationsystem.com/DelegatedAdmin.wsdl under the authenticationsystem.com domain.

Removal of "Forbidden Words" List for EASI Accounts

In one embodiment, a list of words that are either considered offensive or in appropriate for a user to use as part of the user's profile may be maintained by the authentication system, by the affiliates, or by both the authentication system and the affiliates. Each namespace is configurable with its own forbidden words list.

For the authentication system, and specifically for EASI accounts, having this list may create a unique problem in that EASI accounts cannot be created if even part of the e-mail address has a sub-string that matches any of the words in the list. As such, in one embodiment, the authentication system will store an empty list thus ensuring that EASI accounts can be created with no restriction whatsoever.

Member Services Interfaces

For the change password interface, if a managed user desires to change her password, the user can do so at the authentication system member services web page. Alternatively, the user can request one of the administrators to change the password. The administrator uses the interface described herein to change the password for the user.

Auditing Actions

Administrators must be logged into the authentication system when exercising their administrator rights. This enables the authentication system to audit a namespace. All actions requested by an affiliate will be recorded for auditing purposes. Aspects of every action are logged including, but not limited to, the time of requested action to the nearest second, the specific administrator who requested the change, the nature of the requested action, and whether the action was successful or not. Also included is the ability to be able to report how many namespaces have been created. If the ability to clean up logging has not been implemented, all logging will persist for the life of the accounts.

One example of a logging configuration is shown below.

| Event | Create credential | Update Credential (change secret Q, change secret A, reset password) | Evict Credential | Rename Credential |
|---|---|---|---|---|
| Information | Time, admin UID, UID, credential name, credential type | Time, admin UID, UID, credential name, credential type, old values | Time, admin UID, UID, credential name, credential type, old value of IsManaged property | Time, UID, Old Name |
| Life | For the life of the authentication system service | For the life of the authentication system service | For the life of the authentication system service | For the life of the authentication system service |

Another example of a logging configuration is shown below.

| Event | Reserve Namespace | Release Namespace | Add/Delete Administrators |
|---|---|---|---|
| Information | Time, NSP ID, name of namespace, added | Time, admin UID, name of namespace | Time, admin UID, UIDs of added/deleted administrators, name of namespace |
| Life | For 5 years or life of namespace (whichever is greater) | For 5 years or life of namespace (whichever is greater) | For the life of the namespace |

Authentication System Implementation

The authentication system of the invention processes each API request received via the web server. In one embodiment, the processing occurs via one or more request handlers. For example, the request handlers may be encapsulated in a dynamic-linked library (DLL) such as DelegatedAdmin.DLL, which includes entries for the request types described and/or contemplated herein. Exemplary request handlers are next described in the context of XML.

The XML request handler for reserving a namespace performs functions including, but not limited to, validating the authorization node (ticket not required), looking up requested namespace, issuing a domain name service query (DNSQuery) request to obtain domain MX records, verifying that the affiliate administrator has a valid account in the affiliate's domain, setting the namespace as managed, creating a new EASI account for the namespace administrator, adding each administrator to the administrator table, and returning a success response if the reserve namespace request succeeds. An error response is returned if the namespace is already managed, if the affiliate's domain is not listed, or if the affiliate name is not valid. If an error occurs, the namespace registration will be backed out.

The XML request handler for removing a member or user from a namespace performs functions including, but not limited to, validating the authorization node (ticket required), looking up the requested namespace, looking up a profile for the user to be removed, setting the user credential status to inactive (force rename), and returning a response XML. An error response is returned if the namespace is not managed, if the namespace is managed by a different affiliate, if the user ticket is not that of an authorized administrator, if the namespace status is not 'Managed', if the user is not in the specified domain, or if the user is the last administrator in the domain.

The XML request handler for releasing a namespace performs functions including, but not limited to, validating the authorization node (ticket required), looking up the requested namespace, setting the namespace status to 'Unmanaged', and returning a success response if the namespace is successfully released. An error response is returned if the requested namespace is not managed, if the requested namespace is managed by a different affiliate, or if the user ticket is not that of an authorized admin.

The XML request handler for resetting a password for a managed account performs functions including, but not limited to, validating the authorization node (ticket required), looking up the requested namespace, and setting the new password value. An error response is returned if the password is invalid, if the namespace is not managed, if the namespace is managed by a different affiliate, if the user ticket is not that of an authorized administrator, or if the namespace status is not 'Managed.'

The XML request handler for editing an administrator list performs functions including, but not limited to, validating the authorization node (ticket required), looking up the requested namespace, adding the user as an administrator, removing the user as an administrator, and returning a response XML. An error response is returned if the namespace is not managed, if the namespace is managed by a different affiliate, if the administrator ticket is not that of an authorized administrator, if the namespace status is not 'Managed,' if the specified user is not in either the affiliate or managed namespace, if the authorizing administrator is a namespace administrator trying to delete an affiliate administrator, or if the <Action> element is anything other than Add or Delete. In addition, an error response will be returned if the <Action> element is Add and the specified user is already an administrator, and if the <Action> element is Delete and the user is either the last administrator in the namespace or the authorizing administrator specified in the call.

The XML request handler for enumerating administrators performs functions including, but not limited to, validating the authorization node (ticket required), looking up requested namespace, enumerating all administrators of the specified type, add an element for each to the response XML object, and returning a response XML. An error response will be returned if the namespace is not managed, if the namespace is managed by a different affiliate, if the user ticket is not that of an authorized administrator, if the namespace status is not 'Managed', or if the type is not Namespace, Affiliate, or Both.

In addition, the registration code rejects web signup requests in managed namespaces for requests not received from a valid administrator. Further, database accessor functionality allows access to the domain namespace and administrator tables. The invention includes a method to select a namespace record by name, to add and delete namespaces from the table, and to update the status of a namespace. The invention also includes a method to select an administrator record by name, and to add and delete administrators from a namespace. The database accessor functionality also sets user accounts to force rename and to allow rename or become managed.

Changing a User Sign-In

In one embodiment, there is a way for users of a managed namespace to be able to change their sign-in names by means of a SOAP interface. A user may want to change a sign-in name from one managed namespace to another. This section describes the functionality that will allow a managed user to change usernames or sign-in names. For example, getting married is one of the ways that could cause a managed user to want to change a sign in name. Per the rights associated with a managed user, such a user is not allowed to change his sign in name without assistance. If a managed user goes to the authentication system member services page and tries to change the user's sign-in name, the user will be told to contact the user's administrator. Alternatively, the managed user may be directed to the location (e.g., URL, phone number, etc.) where the managed user needs to go to change the sign-in name. The entry point for this interface may be a link on the authentication system member services page.

Figure 4:
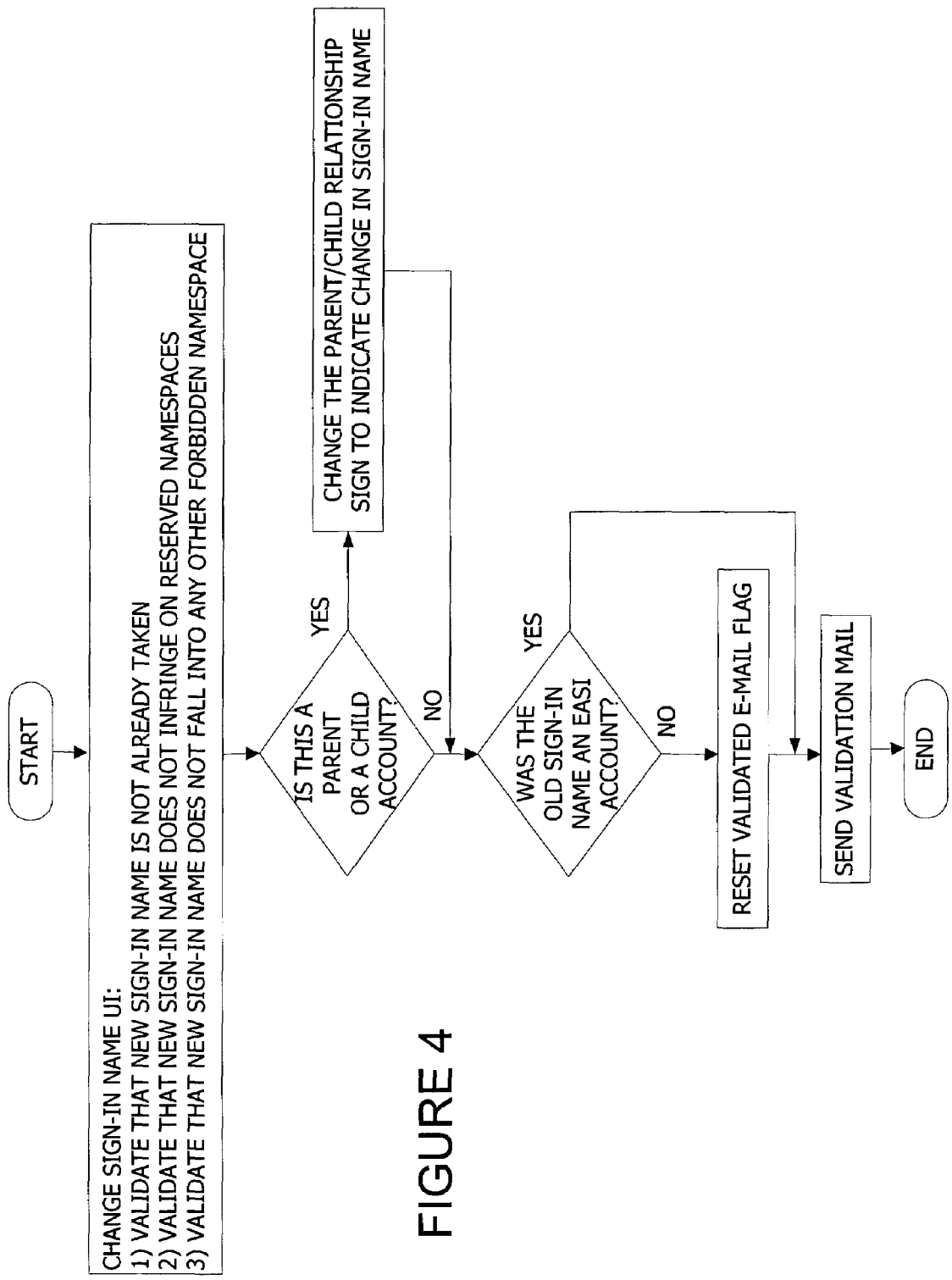
FIG. 4 is an exemplary flow chart illustrating operation of an API function call for changing the sign-in of a user.

Referring next to FIG. 4, a flow chart illustrates exemplary operation of an API function call for changing the sign-in of a user. Those skilled in the art will note that the set of steps in FIG. 4 and their ordering are meant to serve as a guide to what steps need to be taken but additional steps and/or optimizations are possible.

Figure 5:
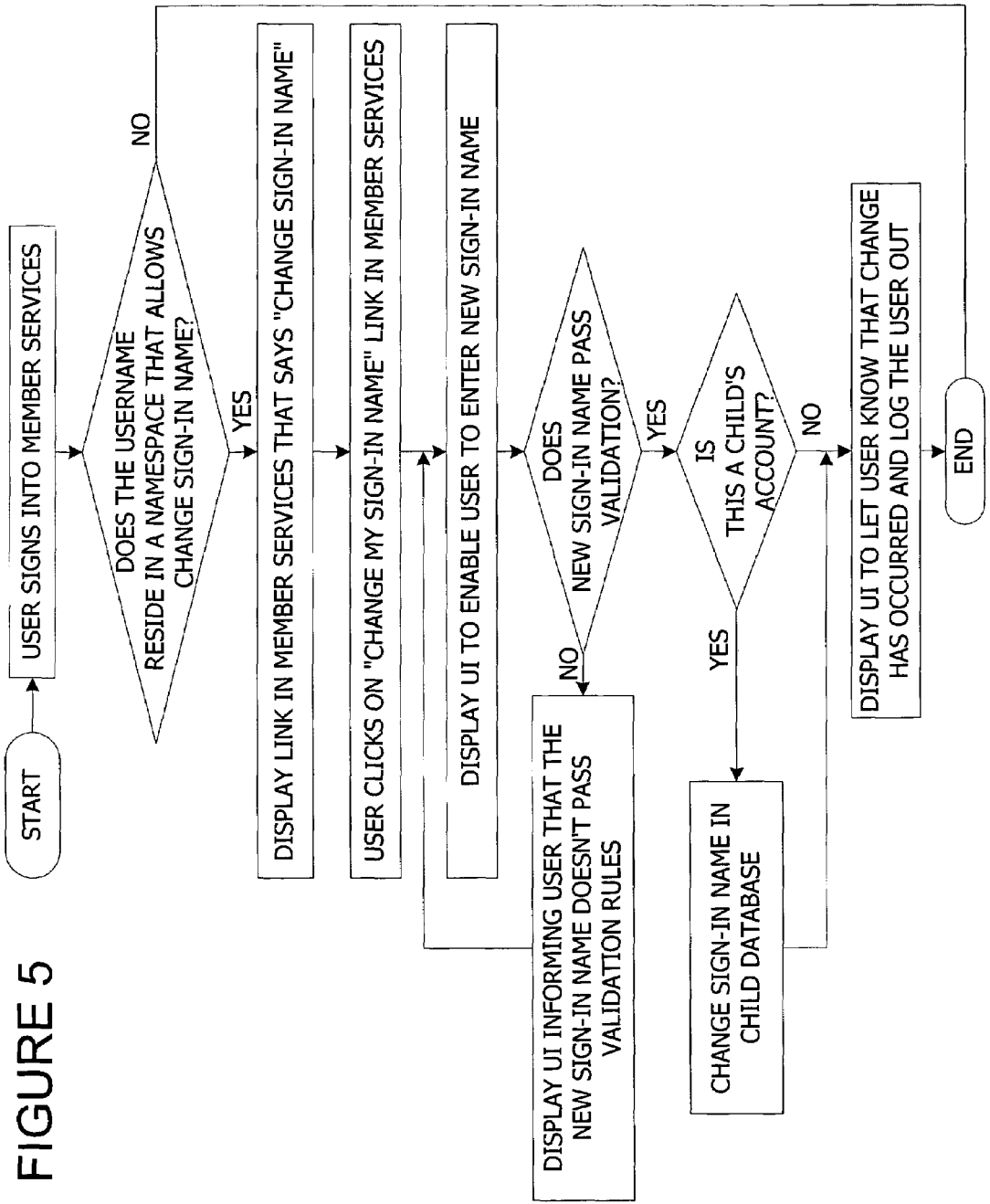
FIG. 5 is an exemplary flow chart illustrating alternative operation of an API function call for changing the sign-in of a user.
Figure 6:
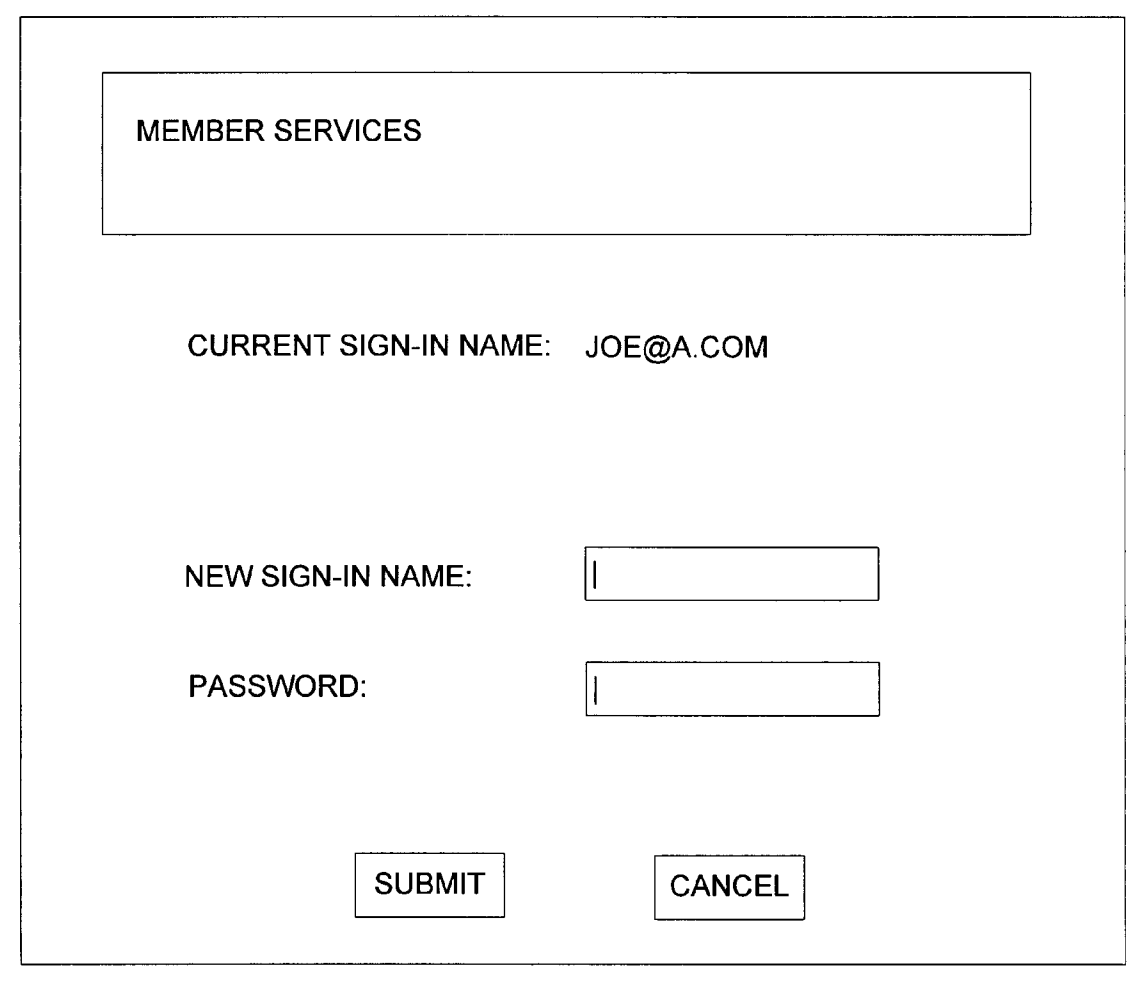
Figure 8:
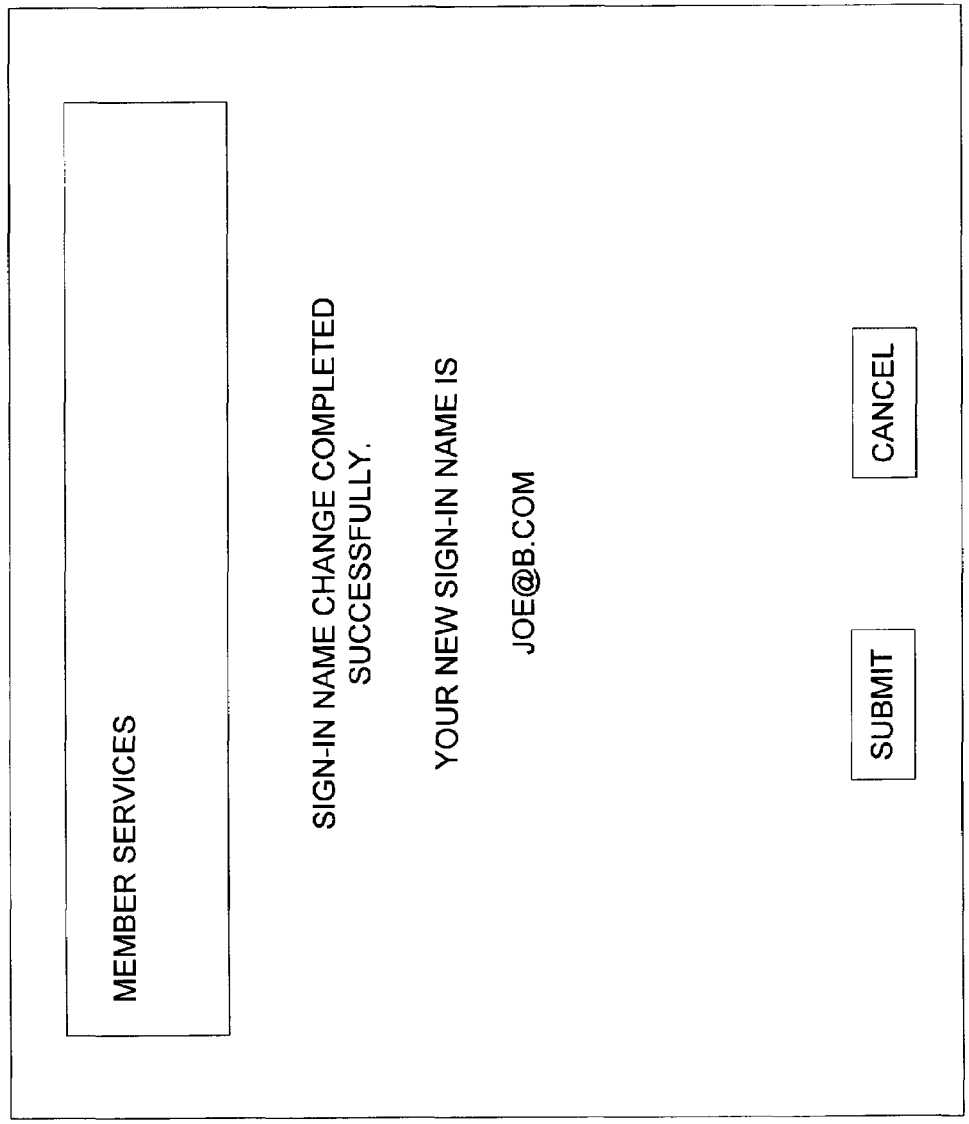
FIG. 8 is an exemplary user interface displaying a success response when the sign-in of a user has been changed successfully.

Referring next to FIG. 5, a flow chart illustrates alternative operation of an API function call for changing the sign-in of a user. FIGS. 6-8 illustrate exemplary screenshots of the change user sign-in API. FIG. 6 illustrates an exemplary web page for changing the sign-in of a user. FIG. 7 illustrates an error response generated if the sign-in name of the user entered via FIG. 6 is invalid. FIG. 8 illustrates a success response generated if the sign-in name of the user is successfully changed.

An administrator for a namespace may change a user's sign-in name on behalf of the user (e.g., by visiting the web site of the ASP providing the account). This will be accomplished via an XML interface. The NSO or NSP who owns the namespace exposes a tool or UI that enables an administrator to change a sign-in name of a user. The administrator will be allowed to change the sign in name for users belonging to namespaces over which the administrator has authorization.

It is possible for an NSP to change the sign in names for users that belong to a particular namespace into that of another namespace provided the NSP owns the namespace. The change sign-in name functionality will be implemented on a per-namespace basis. That is, it may not be possible to change one's sign-in name from Joe@A.com to Joe@B.com or vice versa. In one embodiment, an affiliate can chose whether they want to allow a user to change a sign-in name into a namespace, out of a namespace or within a namespace.

If the administrator of a namespace wants to evict a user from a namespace, the administrator visits the affiliate web site. The UI at this page allows the administrator to force a user out of a namespace or otherwise re-claim the account. Since the account is not deleted (the UID is still active), the affiliate de-authorizes a UID if there are any privileges attached to it. When an administrator uses this UI, the affiliate calls a SOAP interface provided by the authentication system to change the state of this user from being a managed user to being unmanaged as well as forcing a change sign-in name on it. For example, in a managed namespace, the interfaces allow an administrator to evict a user in case someone has been "fired."

Referring next to FIG. 9, an exemplary web page illustrates the interface for forcing a user to change the user's sign-in. The web page of FIG. 9 is used when a user is fired or the administrator otherwise wants to re-claim a managed account. Referring next to FIG. 10, an exemplary web page illustrates an error response generated if the sign-in name of the user entered via FIG. 9 is invalid.

The interfaces also allow an administrator to change the user or sign-in name of a person within a namespace or across namespaces if the administrator has the rights to do so. In an unmanaged namespace, the XML login returns an error if the account needs to be forced to change the sign-in name.

This section describes the page flow for both the simple (voluntary) change sign-in name as well as the forced change sign-in name. To guide the user back to the destination that the user originally came from, the following exemplary rules are offered. The return URL (ru), embedded in the query string (QS), identifies to the authentication server the URL from which web site the user sent the request.

| | Forced Change sign-in name |
|---|---|
| Cancel | User is taken to Member services home page |
| Submit | If there is a valid (matching) "id" and "ru" on the QS, the user is taken back to the "ru" Else if there is a valid "id", user is taken to default URL for that "id" Else user is taken back to Member services home page |

Alternate embodiments of the interface for changing a user sign-in include an MD5 interface, a digest interface, an XML interface, and a Kerberos interface. For applications using the MD5 interface, once a user is signed in, the application does not periodically re-authenticate the user. Therefore, if a user is already signed in while his account enters the forced rename state, they will not be forced to sign-out. Unless a user voluntarily signs out or the application is killed, the user could carry on using the application using the old sign-in name forever. The MD5 authentication interface may not provide any "hook" or UI for the old user to change the sign-in name. Some applications use the MD5 interface for authentication. Therefore, if a user is in the "force change sign-in name" state and tries to sign into these applications, an error is returned to the user.

For e-mail applications using the digest interface, the application re-authenticates the user every time the user wants to check her e-mail. If a user's account entered the forced re-named state while the user was reading e-mail, there would be no exposure to the user continuing to use the old sign-in name (i.e., the login server would return an error to the client indicating that an authentication failure had occurred and the user must go to the member services page to change the sign-in name). The digest authentication interface, like the MD5 authentication interface, does not have a provision to present a UI to the user signing in. Therefore, for a user who is in a forced sign-in name state, an error will be returned.

For applications using the XML interface, there are many clients that use the XML login and logout interfaces. As in the above cases, it is possible that a user is already signed in when the user account enters the forced rename state. In this case, unless the user signs out or the client application process is killed, the user will be able to use the old sign-in name until the time session cookies expire (e.g., as long as 14 days).

Kerberos is an authentication protocol. This case is very similar to the XML interfaces. If a user is signed on, until the time the user voluntarily signs out or the client application process is killed, the user may carry on using the old sign-in name until the time session cookies expire (e.g., as long as 14 days).

While it is not desirable to have a user continue using a sign-in name that is the subject of eviction, in order to detect this state, the application would have to contact the login server every few minutes. In turn, the login server would have to do a database lookup to determine the state of the user's account. This would be costly in terms of performance and usability. If an affiliate desires to always have a user signed on with the correct sign-in name, they can set a ForcedSignin parameter to 1. This will force the user to re-enter credentials which in turn will force the user to change the sign-in name.

Obtaining Consent to Being Managed

It may happen that a user may have already signed up for an authentication system account before a company starts using an NSP. In this case, the login page will present a UI to the user indicating that if the user wants to continue using the account with the same sign-in name, the user must consent to being managed or else change the sign-in name. The web page illustrated in FIG. 11 is displayed to such users.

If the user clicks on the first choice (consenting to being managed), then the account is marked as being managed (i.e. IsManaged property is TRUE). If the user selects the second choice, the user is taken to a page where the user may change the sign-in name for the user's account.

Policy Framework

An exemplary policy framework for delegated namespace administration follows. The NSP owns the namespace but not the accounts within the namespace. NSPs are not allowed to actually delete accounts just de-activate them. If an account becomes unmanaged, NSPs will be given the chance to "evict" the user only if the user has a way of recovering the account by some means. NSPs may not create accounts that are not managed. The authentication system will confirm that the NSP owns the namespace they claim to own. This will be done at a minimum by checking DNS records. Some accounts are never expired, and accounts that are part of a managed namespace will not be aged out. Managed users will be supported by affiliates although authentication system support will maintain the ability to support a customer if the customer cannot get help from an affiliate. However, users will be directed to the affiliate initially to resolve a support issue. If a user is evicted from a namespace, then authentication system support must be able to help the customer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

In an exemplary embodiment, the following error codes are generated by the SOAP service associated with the invention.

| Error Code | Error Description | Meaning |
|---|---|---|
| 0x80041b00 | Error generating XML Document object for Administrator element | The Administrator element in the calling SOAP request was not valid XML. |
| 0x80041b01 | Invalid Administrator | The encrypted account ticket supplied did not correspond to that of a valid account user. |
| 0x80041b02 | Domain Already Managed | A Namespace Reserve request was received for a domain that was already managed. |
| 0x80041b03 | Domain Error - not managed | A request other than Namespace Reserve was received, but the specified domain was not managed. |
| 0x80041b04 | Domain Error - not managed by this affiliate | The specified domain was managed by an affiliate other than that whose site ID was provided. |
| 0x80041b05 | Invalid Namespace Administrator Sign in Name | The Namespace Administrator name specified in a Namespace Reserve request was invalid; either not in the requested domain, or no domain specified |
| 0x80041b06 | Invalid Affiliate Administrator Name | The Affiliate Administrator name specified in a Namespace Reserve request was invalid; either not in the affiliate domain, no domain specified, or could not find an account credential. |
| 0x80041b07 | Error generating XML Document Object for request | The supplied SOAP request was not valid XML |
| 0x80041b08 | Invalid Domain Element or Invalid SiteID Element | The specified subelement of the supplied <Authorization> node was missing |
| 0x80041b09 | Invalid domain | The specified domain was invalid, either zero length, more than 129 characters, invalid character, or not a valid first-tier domain (more than one dot). |
| 0x80041b0a | Invalid Action parameter | The <Action> parameter specified for an Edit Admin List request was something other than 'Add' or 'Delete' |
| 0x80041b0b | Invalid Version Parameter | The <ClientVersion> parameter was unrecognized |
| 0x80041b0c | Managed domain may only be deleted by affiliate administrator | Attempt to Release a domain by a namespace administrator |
| 0x80041b0c | Invalid administrator to be added/deleted - namespace administrator cannot add/delete affiliate administrator | Attempt to add or delete an affiliate administrator by a namespace administrator |
| 0x80041b0d | Invalid User - not in managed domain | Attempt to remove a member not in the managed domain |
| 0x80041b0d | User Already Present | Attempt to signup a member already managed |
| 0x80041b0d | Invalid User Name | Attempt to signup a member with an invalid user name - either no domain, or not in the managed domain |
| 0x80041b0e | Error retrieving SignInName Element | The <SignInName> element in a Signup request was not valid XML |
| 0x80041b0f | varies | A required parameter was not present |
| 0x80041b10 | InvalidSiteID - not a namespace affiliate | The affiliate owning the specified Site ID is not a namespace affiliate or no affiliate could be found with the specified Site ID |
| 0x80041b11 | Invalid SiteID - Not Numeric | Self-explanatory |
| 0x80041b12 | Administrator Ticket has expired - need to revalidate | Self-explanatory |
| 0x80041b13 | Error nnnn during rollback of NameSpaceReserve. Previous error code: nnnn Description: <error description> | A double error has occurred. After successfully reserving a namespace, an error occurred in marking one of the administrators, then another error occurred while releasing the namespace. |
| 0x80041b14 | Type Parameter Invalid | The <Type> parameter supplied for an Enumerate Administrators request was something other than 'Both', 'Namespace', or 'Affiliate' |
| 0x80041b15 | Invalid administrator to be added - already an administrator | Self-explanatory |
| 0x80041b16 | Invalid administrator to be deleted - can't delete last administrator in domain | Self-explanatory |
| 0x80041b17 | Invalid administrator to be deleted - requesting administrator can't delete self | Self-explanatory |

APPENDIX B

The following SOAP-based XML code exemplifies some of the various APIs provided by the invention in an exemplary embodiment.

The format of an exemplary call to reserve a namespace follows.

```
<SOAP-ENV:Envelope xmlns:SOAP-
ENV="http://schemas.xmlsoap.org/soap/envelope/"
        SOAP-ENV:encodingStyle="http://schemas.xmlsoap.org/soap/encoding/">
            <SOAP-ENV:Body>
                <m:NameSpaceReserveRequest
                    xmlns:m="http://www.authenticationsystem.com/NameSpace.xsd">
                        <ClientInfo>{Client Application Name}</ClientInfo>
                        <Version>2.0</Version>
                        <Authorization>
                            <Domain> EncryptedkeyX{A.com}</Domain>
                            <SiteID>{X}</SiteID>
                        </Authorization>
                        <AffiliateAdmin>Joe@A.com</AffiliateAdmin>
                        <NameSpaceAdmin>
                            <SignInName>Fred@B.com</SignInName>
                            <Password>101-Dalmations</Password>
                        </NameSpaceAdmin>
                </m:NameSpaceReserveRequest>
            </SOAP-ENV:Body>
    </SOAP-ENV:Envelope>
```

If the request to reserve a namespace succeeds, the format of a NameSpaceReserveResponse XML response is as follows.

```
<SOAP-ENV:Envelope xmlns:SOAP-ENV="http://schemas.xmlsoap.org/soap/envelope/"
    SOAP-ENV:encodingStyle="http://schemas.xmlsoap.org/soap/encoding/">
        <SOAP-ENV:Body>
            <m:NameSpaceReserveResponse
                xmlns:m="http://www.authenticationsystem.com/NameSpace.xsd">
                    <Success>True</Success>
                    <UID>123456789</UID>
            </m:NameSpaceReserveResponse>
        </SOAP-ENV:Body>
</SOAP-ENV:Envelope>
```

If the request to reserve the namespace fails, the following SOAP error response may be sent.

```
<SOAP-ENV:Envelope xmlns:SOAP-ENV="http://schemas.xmlsoap.org/soap/envelope/">
    <SOAP-ENV:Body>
        <SOAP-ENV: Fault>
            <faultcode>SOAP-ENV: Server</faultcode>
            <faultstring>{error text message}</faultstring>
            <detail>
                <mserror: errorInfo
                  xmlns:mserror="http://schemas.com/soap-toolkit/faultdetail/error/">
                    <mserror:returnCode{code}</mserror: returnCode>
                        <mserror:serverErrorInfo>
                        <mserror:description>{error text message }</mserror:description>
                    </mserror:serverErrorInfo>
                    <mserror:callStack>
                        <mserror:callElement>
                            <mserror:component>DelegatedAdmin</mserror:component>
                                <mserror:description>{error message text}</mserror:description>
                                <mserror:returnCode>{ code}</mserror:returnCode>
                        </mserror:callElement>
                    </mserror:callStack>
                  </mserror:errorInfo>
            </detail>
        </SOAP-ENV: Fault>
    </SOAP-ENV:Body>
</SOAP-ENV:Envelope>
```

The format of an exemplary SOAP call to release a namespace (NameSpaceReleaseRequest) follows.

```
<SOAP-ENV:Envelope xmlns:SOAP-
ENV="http://schemas.xmlsoap.org/soap/envelope/"
        SOAP-ENV:encodingStyle="http://schemas.xmlsoap.org/soap/encoding/"/>
            <SOAP-ENV:Body>
                <m:NameSpaceReleaseRequest
                    xmlns:m="http://www.authenticationsystem.com/NameSpace.xsd">
                        <ClientInfo>{Client Application Name}</ClientInfo>
                        <Version>2.0</Version>
                        <Authorization>
                            <Domain> EncryptedkeyX{A.com}</Domain>
                            <SiteID>{X}</SiteID>
                            <AdminTicket>{ticket}</AdminTicket>
                        </Authorization>
                </m:NameSpaceReleaseRequest>
            </SOAP-ENV:Body>
</SOAP-ENV:Envelope>
```

If the namespace is successfully released, the affiliate will get a response such as the following SOAP response.

```
<SOAP-ENV:Envelope xmlns:SOAP-ENV="http://schemas.xmlsoap.org/soap/envelope/"
    SOAP-ENV:encodingStyle="http://schemas.xmlsoap.org/soap/encoding/"/>
        <SOAP-ENV:Body>
    <m: NameSpaceReleaseResponse
        xmlns:m="http://www.authenticationsystem.com/NameSpace.xsd">
            <Success>True</Success>
    <m: NameSpaceReleaseResponse>
    </SOAP-ENV:Body>
</SOAP-ENV:Envelope>
```

If the request to release fails, the affiliate will get an error response such as the following SOAP response.

```
<SOAP-ENV:Envelope xmlns:SOAP-ENV="http://schemas.xmlsoap.org/soap/envelope/">
    <SOAP-ENV:Body>
            <SOAP-ENV: Fault>
                    <faultcode>SOAP-ENV: Server</faultcode>
        <faultstring>{error text message}</faultstring>
        <detail>
                    <mserror: errorInfo
                        xmlns:mserror="http://schemas.com/soap-toolkit/faultdetail/error/">
                        <mserror:returnCode{code}</mserror:returnCode>
                                <mserror:serverErrorInfo>
                        <mserror:description>{error text message }</mserror:description>
                        </mserror:serverErrorInfo>
                        <mserror:callStack>
                            <mserror:callElement>
                                <mserror:component>DelegatedAdmin</mserror:component>
                                <mserror:description>{error message text}</mserror:description>
                                <mserror:returnCode>{ code}</mserror:returnCode>
                            <mserror:callElement>
                        </mserror:callStack>
                    </mserror:errorInfo>
        </detail>
        </SOAP-ENV: Fault>
    </SOAP-ENV:Body>
</SOAP-ENV:Envelope>
```

The format of an exemplary SOAP call to create a user account (NameSpaceSignupRequest) follows.

```
<SOAP-ENV:Envelope xmlns:SOAP-
ENV="http://schemas.xmlsoap.org/soap/envelope/"
    SOAP-ENV:encodingStyle="http://schemas.xmlsoap.org/soap/encoding/"/>
        <SOAP-ENV:Body>
            <m: NameSpaceSignupRequest
                xmlns:m="http://www.authenticationsystem.com/NameSpace.xsd">
                <ClientInfo>{Client Application Name}</ClientInfo>
                <Version>2.0</Version>
                <Authorization>
                    <Domain> EncryptedkeyX{A.com}</Domain>
                    <SiteID>{X}</SiteID>
                    <AdminTicket>{ ticket}</AdminTicket>
                </Authorization>
                <User>
                    <SignInName>Fred@A.com</SignInName>
                    <Password>101-Dalmations</Password>
                <User>
            </m: NameSpaceSignupRequest>
        </SOAP-ENV:Body>
</SOAP-ENV:Envelope>
```

If an account is successfully created, the following response may be sent.

```
<SOAP-ENV:Envelope xmlns:SOAP-
ENV="http://schemas.xmlsoap.org/soap/envelope/"
    SOAP-
ENV:encodingStyle="http://schemas.xmlsoap.org/soap/encoding/">
        <SOAP-ENV:Body>
            <m: NameSpaceSignupResponse
                xmlns:m="http://www.authenticationsystem.com/
                NameSpace.xsd">
```

-continued

```
                <Success>True</Success>
                <UID>123456859</UID>
            </m: NameSpaceSignupResponse>
        </SOAP-ENV:Body>
</SOAP-ENV:Envelope>
```

If the account creation fails, the following SOAP response with the error may be sent to the caller.

```
<SOAP-ENV:Envelope xmlns:SOAP-ENV="http://schemas.xmlsoap.org/soap/envelope/">
    <SOAP-ENV:Body>
        <SOAP-ENV: Fault>
            <faultcode>SOAP-ENV: Server</faultcode>
            <faultstring>{error text message}</faultstring>
            <detail>
                <mserror: errorInfo
                    xmlns:mserror="http://schemas.com/soap-toolkit/faultdetail/error/">
                    <mserror:returnCode{code}</mserror: returnCode>
                        <mserror:serverErrorInfo>
                            <mserror:description>{error text message }</mserror:description>
                        </mserror: serverErrorInfo>
                    <mserror:callStack>
                        <mserror:callElement>
                            <mserror:component>DelegatedAdmin</mserror:component>
                            <mserror:description>{error message text}</mserror:description>
                            <mserror:returnCode>{ code}</mserror:returnCode>
                        </mserror:callElement>
                    </mserror:callStack>
                </mserror:errorInfo>
            </detail>
        </SOAP-ENV: Fault>
    </SOAP-ENV:Body>
</SOAP-ENV:Envelope>
```

An exemplary SOAP-based request for removing user accounts from a namespace follows.

```
        <SOAP-ENV:Envelope xmlns:SOAP-
ENV="http://schemas.xmlsoap.org/soap/envelope/"
        SOAP-ENV:encodingStyle="http://schemas.xmlsoap.org/soap/encoding/">
            <SOAP-ENV:Body>
                <m: NameSpaceRemoveMemberRequest
                    xmlns:m="http://www.authenticationsystem.com/NameSpace.xsd">
                        <ClientInfo>{Client Application Name}</ClientInfo>
                        <Version>2.0</Version>
                        <Authorization>
                        <Domain>EncryptedkeyX{A.com}</Domain>
                        <SiteID>{X}</SiteID>
                        <AdminTicket>{ticket}</AdminTicket>
                    </Authorization>
                    <Remove>
                        <SignInName>Joe@A.com</SignInName>
                    </Remove>
                </m: NameSpaceRemoveMemberRequest>
    </SOAP-ENV:Body>
</SOAP-ENV:Envelope>
```

The following response may be sent to the caller if the user is removed.

```
        <SOAP-ENV:Envelope xmlns:SOAP-
ENV="http://schemas.xmlsoap.org/soap/envelope/"
                            SOAP-
ENV:encodingStyle="http://schemas.xmlsoap.org/soap/encoding/">
                        <SOAP-ENV:Body>
            <m: NameSpaceRemoveMemberResponse
                    xmlns:m="http://www.authenticationsystem.com/NameSpace.xsd">
                        <Success>True</Success>
            </m: NameSpaceRemoveMemberResponse>
            </SOAP-ENV:Body>
        </SOAP-ENV:Envelope>
```

If an error occurs while processing a request to remove a user account from a namespace, an error response will be sent such as the following SOAP-based error response.

```
<SOAP-ENV:Envelope xmlns:SOAP-ENV="http://schemas.xmlsoap.org/soap/envelope/">
    <SOAP-ENV:Body>
            <SOAP-ENV:Fault>
                <faultcode>SOAP-ENV: Server</faultcode>
            <faultstring>{error text message}</faultstring>
            <detail>
                <mserror: errorInfo
                    xmlns:mserror="http://schemas.com/soap-toolkit/faultdetail/error/">
                    <mserror:returnCode{code}</mserror: returnCode>
                            <mserror:serverErrorInfo>
                        <mserror:description>{error text message }</mserror:description>
                    </mserror:serverErrorInfo>
                    <mserror:callStack>
                        <mserror:callElement>
                            <mserror:component>DelegatedAdmin</mserror:component>
                            <mserror:description>{error message text}</mserror:description>
                            <mserror:returnCode>{ code}</mserror:returnCode>
                        </mserror:callElement>
                    </mserror:callStack>
                </mserror:errorInfo>
            </detail>
        </SOAP-ENV:Fault>
    </SOAP-ENV:Body>
</SOAP-ENV:Envelope>
```

An example SOAP-based API call to enumerate all the administrators in a given namespace is the following.

```
<SOAP-ENV:Envelope xmlns:SOAP-
ENV="http://schemas.xmlsoap.org/soap/envelope/"
        SOAP-ENV:encodingStyle="http://schemas.xmlsoap.org/soap/encoding/">
            <SOAP-ENV:Body>
                <m: NameSpaceEnumerateAdminsRequest
                    xmlns:m="http://www.authenticationsystem.com/NameSpace.xsd">
                        <ClientInfo>{Client Application Name}</ClientInfo>
                        <Version>2.0</Version>
                        <Authorization>
                            <Domain> EncryptedkeyX{A.com}</Domain>
                            <SiteID>{X}</SiteID>
                            <AdminTicket>{ ticket}</AdminTicket>
                        </Authorization>
                        <Type>Namespace</Type>
                </m: NameSpaceEnumerateAdminsRequest>
            </SOAP-ENV:Body>
</SOAP-ENV:Envelope>
```

An exemplary SOAP-based response for enumerating a list of administrators for a namespace follows.

```
<SOAP-ENV:Envelope xmlns:SOAP-
ENV="http://schemas.xmlsoap.org/soap/envelope/"
        SOAP-ENV:encodingStyle="http://schemas.xmlsoap.org/soap/encoding/">
            <SOAP-ENV:Body>
                <m: NameSpaceEnumerateAdminsResponse
                    xmlns:m="http://www.authenticationsystem.com/NameSpace.xsd">
                        <Success>True</Success>
                        <Admins>
                            <Name>Joe@A.com</Name>
                            <Name>Fred@A.com</Name>
                            <Name>Sally@A.com</Name>
                        </Admins>
                </m: NameSpaceEnumerateAdminsResponse>
            </SOAP-ENV:Body>
</SOAP-ENV:Envelope>
```

An exemplary API call for requesting the authentication server to add or delete administrators for the namespace is shown below.

```
<SOAP-ENV:Envelope xmlns:SOAP-
ENV="http://schemas.xmlsoap.org/soap/envelope/"
        SOAP-ENV:encodingStyle="http://schemas.xmlsoap.org/soap/encoding/">
            <SOAP-ENV:Body>
                <m: NamespaceEditAdminListRequest
                    xmlns:m="http://www.authenticationsystem.com/NameSpace.xsd">
                        <ClientInfo>{Client Application Name}<ClientInfo>
                        <Version>2.0</Version>
                        <Authorization>
                            <Domain> EncryptedkeyX{A.com}</Domain>
                            <SiteID>{X}</SiteID>
                            <AdminTicket>{Encrypted ticket}</AdminTicket>
                        </Authorization>
                        <Action>Add</Action>
                        <Admin>Joe@A.com</Admin>
                </m: NameSpaceEditAdminListRequest>
            </SOAP-ENV:Body>
        </SOAP-ENV:Envelope>
```

If the request to process the administrator cannot be processed due to an error, a SOAP-based error response such as shown below will be sent.

```
<SOAP-ENV:Envelope xmlns SOAP-ENV="http://schemas.xmlsoap.org/soap/envelope/">
    <SOAP-ENV:Body>
                <SOAP-ENV: Fault>
                    <faultcode>SOAP-ENV: Server</faultcode>
                <faultstring>{error text message}</faultstring>
            <detail>
                <mserror: errorInfo
                    xmlns:mserror="http://schemas.com/soap-toolkit/faultdetail/error/">
                    <mserror:returnCode{code}</mserror: returnCode>
                            <mserror: serverErrorInfo>
                        <mserror:description>{error text message }</mserror:description>
                    </mserror: serverErrorInfo>
                    <mserror:callStack>
                        <mserror:callElement>
                            <mserror:component>DelegatedAdmin</mserror:component>
                            <mserror:description>{error message text}</mserror:description>
                            <mserror:returnCode>{ code}</mserror:returnCode>
                        </mserror:callElement>
                    </mserror:callStack>
                </mserror:errorInfo>
            </detail>
        </SOAP-ENV: Fault>
    </SOAP-ENV:Body>
</SOAP-ENV:Envelope>
```

The following SOAP request may be used to obtain a list of administrators that have administrative rights to the namespace.

```
<SOAP-ENV:Envelope xmlns:SOAP-ENV="http://schemas.xmlsoap.org/soap/envelope/"
    SOAP-ENV:encodingStyle="http://schemas.xmlsoap.org/soap/encoding/">
            <SOAP-ENV:Body>
            <m: NameSpaceEnumerateAdminsRequest
                    xmlns:m="http://www.authenticationsystem.com/NameSpace.xsd">
                <ClientInfo>{Client Application Name}<ClientInfo>
                <Version>2.0</Version>
                <Authorization>
                    <Domain> EncryptedkeyX{A.com}</Domain>
                    <SiteID>{X}<SiteID>
                    <AdminTicket>{ ticket}</AdminTicket>
                        </Authorization>
                        <Type>Namespace</Type>
                </m: NameSpaceEnumerateAdminsRequest>
            </SOAP-ENV:Body>
    </SOAP-ENV:Envelope>
```

If the request to enumerate administrators is valid, the authentication server responds with a list of administrators for the namespace in a response such as with the following SOAP response.

```
<SOAP-ENV:Envelope xmlns:SOAP-ENV="http://schemas.xmlsoap.org/soap/envelope/"
    SOAP-ENV:encodingStyle="http://schemas.xmlsoap.org/soap/encoding/">
            <SOAP-ENV:Body>
            <m: NameSpaceEnumerateAdminsResponse
                    xmlns:m="http://www.authenticationsystem.com/NameSpace.xsd">
                <Success>True</Success>
                <Admins>
                        <Name>Joe@A.com</Name>
                    <Name>Fred@A.com</Name>
                    <Name>Sally@A.com</Name>
```

```
        </Admins>
    </m: NameSpaceEnumerateAdminsResponse>
  </SOAP-ENV:Body>
</SOAP-ENV:Envelope>
```

If there a problem with processing the request to enumerate administrators in a namespace, the following SOAP [10] response is an exemplary error response sent to the requester.

```
<SOAP-ENV:Envelope xmlns SOAP-ENV="http://schemas.xmlsoap.org/soap/envelope/">
    <SOAP-ENV:Body>
              <SOAP-ENV: Fault>
                    <faultcode>SOAP-ENV: Server</faultcode>
          <faultstring>{error text message}</faultstring>
          <detail>
                    <mserror: errorInfo
                        xmlns:mserror="http://schemas.com/soap-toolkit/faultdetail/error/">
                        <mserror:returnCode{code}</mserror: returnCode>
                               <mserror:serverErrorInfo>
                            <mserror:description>{error text message }</mserror:description>
                        </mserror:serverErrorInfo>
                        <mserror:callStack>
                            <mserror:callElement>
                                <mserror:component>DelegatedAdmin</mserror:component>
                                <mserror:description>{error message text}</mserror:description>
                                <mserror:returnCode>{code}</mserror:returnCode>
                            </mserror:callElement>
                        </mserror:callStack>
                    </mserror:errorInfo>
          </detail>
              </SOAP-ENV: Fault>
    <SOAP-ENV:Body>
</SOAP-ENV:Envelope>
```

The SOAP request to reset a password may look like the following.

```
<SOAP-ENV:Envelope xmlns:SOAP-ENV="http://schemas.xmlsoap.org/soap/envelope/"
              SOAP-ENV:encodingStyle="http://schemas.xmlsoap.org/soap/encoding/">
        <SOAP-ENV:Body>
    <m: NameSpaceResetPasswordRequest
        xmlns:m="http://www.authenticationsystem.com/NameSpace.xsd">
        <ClientInfo>{Client Application Name}</ClientInfo>
        <Version>2.0</Version>
        <Authorization>
                        <Domain> EncryptedkeyX{A.com}</Domain>
            <SiteID>{X}<SiteID>
            <AdminTicket>{ticket}</AdminTicket>
                </Authorization>
        <User>Fred@A.com</User>
                  <Password>OldSmokes</Password>
    </m: NameSpaceResetPasswordRequest>
  </SOAP-ENV:Body>
</SOAP-ENV:Envelope>
```

The following SOAP response is an exemplary SOAP response to inform the requestor that the attempt to reset a password succeeded.

```
<SOAP-ENV:Envelope xmlns:SOAP-ENV="http://schemas.xmlsoap.org/soap/envelope/"
    SOAP-ENV:encodingStyle="http://schemas.xmlsoap.org/soap/encoding/"/>
         <SOAP-ENV:Body>
    <m: NameSpaceResetPasswordResponse
```

```
            xmlns:m="http://www.authenticationsystem.com/NameSpace.xsd">
                <Success>True</Success>
        </m: NameSpaceResetPasswordResponse>
    </SOAP-ENV:Body>
</SOAP-ENV:Envelope>
```

The following SOAP response is an exemplary SOAP response to inform the requestor that the attempt to reset a password failed.

```
<SOAP-ENV:Envelope xmlns:SOAP-ENV=http://schemas.xmlsoap.org/soap/envelope/">
    <SOAP-ENV:Body>
                <SOAP-ENV: Fault>
                        <faultcode>SOAP-ENV: Server</faultcode>
                <faultstring>{error text message}</faultstring>
                <detail>
                    <mserror: errorInfo
                        xmlns:mserror="http://schemas.com/soap-toolkit/faultdetail/error/">
                        <mserror:returnCode{code}</mserror: returnCode>
                                <mserror:serverErrorInfo>
                            <mserror:description>{error text message }</mserror:description>
                        </mserror:serverErrorInfo>
                        <mserror:callStack>
                            <mserror:callElement>
                                <mserror:component>DelegatedAdmin</mserror:component>
                                <mserror:description>{error message text}</mserror:description>
                                <mserror:returnCode>{ code}</mserror:returnCode>
                            </mserror:callElement>
                        </mserror:callStack>
                    </mserror:errorInfo>
                </detail>
        </SOAP-ENV: Fault>
    </SOAP-ENV:Body>
</SOAP-ENV:Envelope>
```

An exemplary SOAP interface to update a profile follows.

```
<SOAP-ENV:Envelope xmlns:SOAP-ENV="http://schemas.xmlsoap.org/soap/envelope/"
        SOAP-ENV:encodingStyle="http://schemas.xmlsoap.org/soap/encoding/">
                <SOAP-ENV:Body>
            <m: NameSpaceUpdateRequest
                xmlns:m="http://www.authenticationsystem.com/NameSpace.xsd">
                <ClientInfo>{Client Application Name}</ClientInfo>
                <Version>2.0</Version>
                <Authorization>
                            <Domain> EncryptedkeyX{A.com}</Domain>
                    <SiteID>{X}<SiteID>
                    <AdminTicket>{Encrypted ticket}</AdminTicket>
                        </Authorization>
                <User>
                        <SignInName>Fred@A.com</SignInName>
                    <NickName>Joe</NickName>
                    <Email></Email>
                    <Gender></Gender>
                    <Country></Country>
                    <Region></Region>
                    <PostalCode></PostalCode>
                    <Birthdate></Birthdate>
                    <SecretQuestion>Who is the coolest cat on Earth?</SecretQuestion>
                    <SecretAnswer>Toon</SecretAnswer>
                    <AllowEmailinProfile>true</AllowEmailinProfile>
<AllowAuthenticationSystemNetworkEmail>true</AllowAuthenticationSystemNetworkEmail>
                    <LanguagePreference>1033</LanguagePreference>
                    <Accessibility>true</Accessibility>
                    <FirstName>Sachin</FirstName>
                    <LastName>Kukreja</LastName>
                    <TimeZone>America/Los_Angeles</TimeZone>
                    <Occupation>A</Occupation>
```

```
            <Flags>1100110100</Flags></User>
                         K/User>
    </m: NameSpaceUpdateRequest>
</SOAP-ENV:Body>
</SOAP-ENV:Envelope>
```

If the request to update a user's profile succeeds, an XML response such as the following SOAP response is sent to the caller.

```
<SOAP-ENV:Envelope xmlns:SOAP-ENV="http://schemas.xmlsoap.org/soap/envelope/"
            SOAP-ENV:encodingStyle="http://schemas.xmlsoap.org/soap/encoding/">
        <SOAP-ENV:Body>
    <m: NameSpaceUpdateResponse
        xmlns:m="http://www.authenticationsystem.com/NameSpace.xsd">
            <Success>True</Success>
    </m: NameSpaceSignupResponse>
    </SOAP-ENV:Body>
</SOAP-ENV:Envelope>
```

APPENDIX C

The following examples illustrate the invention.

Exemplary Scenarios for Reserving a Namespace

The following examples illustrate reserving a namespace.

Company A has just signed for NSP hosted services. Included in these services is e-mail as well as authentication system accounts. The administrator for A.com goes to the NSP web site and signs up to get these services on behalf of Company A. The NSP service begins a process by which they own the DNS records for the namespace (this might take up to 24 hours). Once that is accomplished, the NSP servers call a SOAP interface that the authentication system hosts and requests the namespace to be reserved. The namespace is reserved instantaneously. This means that only the NSP can create EASI accounts in this namespace. At the same time, creation of accounts via the authentication system registration page is disallowed.

In another example, Company A has just signed up for an affiliate's service that includes authentication system accounts but no e-mail. The administrator for A.com goes to the affiliate's web site and signs up to get these services on behalf of the company. The affiliate begins a process by which they own the DNS records for the namespace (this might take up to 24 hours). Once that is accomplished, the affiliate's servers call a SOAP interface that the authentication system hosts and requests the namespace to be reserved. The namespace is reserved instantaneously.

The only difference between the scenarios listed above is the e-mail provisioning in the first scenario. For the second scenario, the namespace is reserved just as in the case of first scenario, but there is no real "e-mail" that is provisioned.

Exemplary Scenarios for Releasing a Namespace

The following example illustrates releasing a namespace.

Company A, which was until now using services hosted by an NSP, decides that it no longer needs these services. The administrator of A.com goes to the NSP web page and informs the NSP service that Company A would like to cancel its service with the NSP. Among other things, the NSP tells the authentication system service that the accounts that were being managed by NSP on behalf of A.com are no longer the responsibility of NSP. Transparent to Company A (and A.com), all accounts in the namespace are now marked as not "managed". Fred, who is an employee of Company A, is now able to completely "own" his authentication system account.

Exemplary Scenario for Creating a User Account Associated with a Namespace

The following example illustrates creating a user account.

After reserving a namespace, the administrator of A.com waits for a few hours and then goes to the NSP web site and starts creating accounts for the people inside the company. The administrator enters the names of the users on the web page provided by the NSP and selects a password on behalf of the user and then informs the user that the user must go to the authentication system member services page and change the secret question and answer (as a hint to the user to recall a forgotten password). The administrator enters a secret Q/A for the accounts. Behind the scenes, the NSP service sends a request to the authentication server to create these accounts.

Exemplary Scenarios for Listing User Accounts Associated with a Namespace

The following examples illustrate listing user accounts associated with a namespace.

Fred works for Company A. He signed up for an authentication system account using his e-mail Fred@A.com. A few weeks later, Company A starts using the services of NSP for e-mail hosting. When the administrator tries to create authentication system accounts for everyone, the administrator can see a list of accounts already existing in the namespace. The administrator notices that Fred already has an account with the authentication system and does not create another account for him. The next time Fred tries to sign-in with his authentication system account, he is told that his account now falls within a managed namespace and that he must either consent to being in a managed namespace or change his sign-in name to one that does not belong to the managed namespace. Fred consents to staying in the managed namespace and can now use his account normally.

The invention also includes the following modified scenarios using various combinations of the APIs of the invention.

In the example above, if the administrator asks Fred if he already has an account, and does not create another account for him, then when Fred tries to sign-in, he is presented with a consent page informing him that in order to continue using the same sign-in name, he must consent to being managed.

Alternatively, in the above scenario, the administrator will create another authentication system account for Fred (since the administrator has no way of knowing if Fred has an account). This will cause a forced change sign-in name on Fred's old account. The next time Fred tries to sign-in, he can do so with the account that he originally had (in which case he will be asked to change sign-in name) or he can sign in with the new account the administrator has created (which will need no consent). In this case, Fred decides to sign-in with the new account. Fred can recover his old identity (buddy lists, etc.) by changing his old account name to something else.

Alternatively, Joe already has an authentication system account with the account name Joe@B.com. Now, as part of A.com, he is asked to create a new account Joe@A.com. Joe would like to merge both accounts or at least be able to change the account name so that he has only one authentication system account that is Joe@A.com. The invention provides such functionality.

In yet another example, Fred is part of Company A, which currently does not use the NSP. Fred's e-mail account is Fred@A.com and he signs up for an authentication system account with this e-mail. When he gets a validation mail (signaling creation of the account), he validates his account. Fred now leaves Company A, which deletes the e-mail address that Fred owned. Company A also starts using the NSP services. Now a new Fred joins the company and A.com would like to give the account name Fred@A.com to the new Fred. However, since they are now using the NSP for hosting e-mail, Company A needs to create an authentication system account with the sign-in name Fred@A.com. Since the namespace A.com is "managed" by NSP, the administrator of A.com creates a new EASI account by going to the NSP web page. The administrator gives the password for that account to the new Fred who will be able to use the account immediately. The old Fred will not lose his data associated with this authentication system account.

Exemplary Scenario for Resetting a Namespace Password

The following example illustrates resetting a namespace password.

Fred has forgotten his password to his authentication system account. He goes to the administrator of his organization who in turn goes to the NSP web page, selects a password and resets the password for Fred. The administrator then supplies Fred with the new password. The administrator would not ask for Fred's country, region, zip code or ask him for the secret Q/A though he may be able to supply them. If Fred went to the authentication system support, he would be told that they are unable to reset his password and that Fred needs to go to NSP support to be able to have his password reset.

Exemplary Scenario for Updating a User Profile

The following example illustrates updating a user profile.

When an ASP creates an account, a mailbox is automatically setup for that user in the database. If that user does not use the account for 90 days, the ASP will de-activate the mailbox, and clear the bit in the database to indicate that the user does not have a mailbox anymore.

Exemplary Scenarios for Changing a User Sign-In

The following examples illustrate changing a user sign-in.

Fred has an account Fred@authenticationsystem.com and decides that he would like to change his sign-in name to FredSmith@authenticationsystem.com. He goes to the member services page and clicks on the "change sign-in name" button that allows him to change his sign-in name. From now on, he uses the sign-in name FredSmith@authenticationsystem.com.

In another example, Joe works for a company A and has an e-mail account Joe@A.com. He signs up for an authentication system account with this name. Company A decides to use the services of an NSP (e.g. NSP) for hosting its e-mail. The namespace A.com is now "managed" by the NSP. A few days later, Joe is fired. The administrator for A.com goes to the NSP web site and clicks on a button, which allows the administrator to de-provision the account Joe@A.com. The next time Joe tries to sign-in with the name Joe@A.com, the login page warns him that his account was part of a managed namespace and that Company A has decided to re-claim that name and that he must change his sign-in name to something other than ending in A.com. Joe types in a new name such as Joe@authenticationsystem.com. His profile information is intact. From now on Joe uses the name Joe@authenticationsystem.com for all his authentication system sign in activities.

In another example, Sue works for Company A and has an e-mail address Sue@A.com. She signs up for an authentication system account using that e-mail address. One day Sue decides to quit the company. When she leaves the company, her e-mail account is canceled but she carries on using the EASI account Sue@A.com. After a few months, Company A decides to use the services of an NSP for hosting e-mail. As part of the deal, everyone gets EASI accounts using the e-mail accounts they had. Soon, a new Sue joins the company. The administrator of A.com goes to the NSP web site and creates a new account Sue@A.com. The new Sue immediately starts using this account without any problems. A few days after the administrator created an account for the new Sue, the old Sue decides to check her account. She tries to sign-in with her sign-in name (Sue@A.com) but the login page tells her that her account is now part of a managed namespace and that her and in order to keep her account information, she will need to change her sign in name to something other than that belonging to the A.com namespace. She picks a new name Sue@authenticationsystem.com and types it in. She is immediately able to see her portfolio. From now on the old Sue uses the name Sue@authenticationsystem.com.

In yet another example, Mary Smith works for Company A, which is using the services of an NSP for its e-mail needs. Her authentication system account (created by the NSP) is MarySmith@A.com, as is her e-mail. Mary now decides to get married and change her last name. She goes to the authentication system member services page and attempts to change her sign-in name but is told that she needs to go to her administrator to request the change. She goes to the administrator of the company A.com and asks the administrator to change her e-mail and authentication system account name to MarySlater@A.com. The administrator goes to the NSP web site and makes this change on her behalf. Mary's e-mail and authentication system sign in name are now changed and she starts using her new account name MarySlater@A.com to access her account information such as her e-mail.

In yet another example, Joe runs a small business and has a web site called JoesCoffee.com. He now wants to have his e-mail hosted by the NSP but is not entirely sure if he wants to start using the NSP services for a long period of time. So, he signs up for e-mail service hosted by NSP (e.g., A.com) and his e-mail address is Joe@A.com. After a few days, Joe finds that the e-mail service is reliable and offers value to him and he decides to ask his NSP to create his e-mail in a domain that he hosts. So he decides to change his sign-in name to Joe@JoesCoffee.com. He goes to the authentication system member services web page where he tries to change his sign-in name; he is informed that since this is a managed account, he must go to his administrator to request a change. He then goes to the NSP portal page where he requests that his sign-in name be changed from Joe@A.com to Joe@JoesCoffee.com. The request is processed immediately and from now on Joe's sign-in name is Joe@JoesCoffee.com. A few days later, Joe decided that he really does not like the e-mail service hosted by NSP for which he is paying a monthly fee. Instead he prefers the lower monthly fees charged if his e-mail address was Joe@A.com. So, he goes to the NSP portal web site and requests that his name be changed back to Joe@A.com. The change is processed instantaneously and from now on Joe's sign in name is Joe@A.com.

In an alternative example, Joe's e-mail address is Joe@A.com, which he uses to sign up for an authentication system account. Now, Joe decides to change his e-mail provider. His e-mail address changes to Joe@B.com. Joe now goes to the authentication system member services and clicks on the change sign-in name link. He enters his new e-mail address. However, it turns out that someone has already signed up for an account using the e-mail address Joe@B.com (clearly Joe is the correct owner of the e-mail address). When Joe gets an error message saying that the sign-in name is already taken, he clicks on the link that displays "Click here if this e-mail address really belongs to you." This link guides Joe through a process where he is able to change his sign-in name while simultaneously contesting the Joe@B.com account.

What is claimed is:

1. One or more computer-readable storage media having stored thereon an application programming interface (API) for communication between an administration server and an authentication server, said API comprising computer-executable instructions for:
   associating a plurality of namespaces with a plurality of administration servers, wherein each of the namespaces is associated with one of the plurality of administration servers, each of the administration servers providing a service relating to the associated namespace for one or more user accounts of the namespace, said authentication server and said administration servers being connected via a data communication network, said user accounts of the namespaces being managed by the authentication server, said authentication server being authorized to authenticate the user accounts of the namespace;
   receiving, by the authentication server, a request from one of the administration servers, said authentication server having a database associated therewith storing authentication information for authenticating the user accounts of each of the namespaces, said one of the administration servers being responsive to an administrator for issuing the request to said authentication server, said request specifying at least one action relating to the administration of the user accounts in the namespace associated with said one of the administration servers for managing the database to be performed by the authentication server to the namespace;
   verifying, by the authentication server, authority of said one of the administration servers to issue the request received by the authentication server; and
   performing, by the authentication server, the action specified by the received, verified request.

2. The computer-readable storage media of claim 1, wherein the database associated with the authentication server stores authorization information relating to the administration servers and wherein verifying the authority of said one of the administration servers to issue the request comprises identifying said one of the administration servers and locating corresponding authorization information for the administration servers in the database associated with the authentication server.

3. The computer-readable storage media of claim 2, wherein identifying said one of the administration servers comprises examining an encrypted ticket accompanying the request, said ticket identifying the administrator.

4. The computer-readable storage media of claim 1, wherein performing the specified action comprises reserving the namespace with the authentication server to prevent an unauthorized user from obtaining an account in the namespace, said request including a domain name associated with the namespace, and further comprising:
   requesting, by the authentication server, domain information for the domain name included in the verified request from a domain name service;
   determining, by the authentication server, authority of said one of the administration servers to reserve the namespace by comparing the received domain information with the verified request; and
   reserving the namespace only if said one of the administration servers is authorized to make the request and reserve the namespace.

5. The computer-readable storage media of claim 4, wherein reserving the namespace comprises creating an administrator account associated with said one of the administration servers to manage the namespace.

6. The computer-readable storage media of claim 1, wherein performing the specified action comprises releasing the namespace to allow any user to obtain an account in the namespace.

7. The computer-readable storage media of claim 1, wherein performing the specified action comprises maintaining and editing a namespace administrator list.

8. The computer-readable storage media of claim 7, wherein editing a namespace administrator list comprises adding at least one administrator to the namespace administrator list.

9. The computer-readable storage media of claim 7, wherein editing a namespace administrator list comprises deleting at least one administrator from the namespace administrator list.

10. The computer-readable storage media of claim 1, wherein performing the specified action comprises editing one or more user accounts in the namespace.

11. The computer-readable storage media of claim 10, wherein editing one or more user accounts in the namespace comprises creating at least one user account in the namespace.

12. The computer-readable storage media of claim 10, wherein editing one or more user accounts in the namespace comprises resetting a namespace password associated with at least one of the user accounts.

13. The computer-readable storage media of claim 10, wherein editing one or more user accounts in the namespace comprises removing at least one of the user accounts from the namespace.

14. The computer-readable storage media of claim 10, wherein editing one or more user accounts in the namespace comprises editing a profile associated with at least one of the user accounts.

15. The computer-readable storage media of claim 10, wherein editing one or more user accounts in the namespace comprises changing a sign-in name associated with at least one of the user accounts.

16. The computer-readable storage media of claim 1, wherein performing the specified action comprises:
listing user accounts associated with the namespace; and
evicting one or more of the user accounts from the namespace.

17. The computer-readable storage media of claim 1, wherein performing the specified action comprises auditing actions within user accounts associated with the namespace.

18. The computer-readable storage media of claim 1, further comprising returning a success response from the authentication server to said one of the administration servers if the request was received, said one of the administration servers was verified, and the specified action was performed successfully.

19. The computer-readable storage media of claim 1, wherein performing the specified action comprises returning an error response from the authentication server to said one of the administration servers if the request was received, said one of the administration servers was not verified, or the specified action was performed unsuccessfully.

20. The computer-readable storage media of claim 1, wherein the API is based on a simple object access protocol (SOAP).

21. The computer-readable storage media of claim 1, wherein the instructions are computer-executable instructions stored on one or more computer readable storage media.

22. The computer-readable storage media of claim 1, wherein each namespace is registered with a domain name service, each registered namespace having user accounts which have access to a service associated with the registered namespace.

23. A method for delegating at least one administrative task from a first system to a second system, said method comprising:
maintaining by a first system, a database of one or more namespaces, said first system being connected to a plurality of second systems via a data communication network;
associating the namespaces with the plurality of second systems, wherein each of the namespaces is associated with one of the plurality of second systems, each of the second systems providing a service associated with the associated namespace to one or more user accounts of the namespace on the data communication network, said database maintained by the first system including the namespaces associated with the plurality of second systems;
receiving a call from one of the plurality of second systems by the first system, said call providing a request that at least one routine be performed to implement a desired administrative task for managing the user accounts of the namespace associated with said one of the plurality of second systems; and
executing the routine, by the first system, in response to the call received from said one of the plurality of second systems to implement the administrative task.

24. The method of claim 23 wherein the routine comprises an application programming interface (API) for performing the administrative task.

25. The method of claim 24 wherein the API is implemented according to a simple object access protocol (SOAP).

26. The method of claim 23 further comprising generating an error response if an error occurs during execution of the routine.

27. The method of claim 23 wherein the first system is a multi-site user authentication system and said one of the plurality of second systems is an affiliate selected from the group consisting of an application service provider (ASP), an Internet service provider (ISP), a namespace owner (NSO), and a namespace provisioning (NSP) partner.

28. The method of claim 23 wherein the administrative task comprises reserving at least one of the namespaces to prevent an unauthorized user from obtaining an account in the reserved namespace.

29. The method of claim 28 wherein said one of the plurality of second systems is associated with an ASP and wherein reserving at least one of the namespaces comprises reserving, by the ASP, at least one of the namespaces on behalf of a customer of the ASP.

30. The method of claim 23 wherein the administrative task comprises releasing at least one of the namespaces to allow any user to obtain an account in the released namespace.

31. The method of claim 23 wherein the database maintained by the first system stores a list of namespace administrators corresponding to at least one of the namespaces and wherein the administrative task comprises editing the namespace administrator list.

32. The method of claim 23 wherein the administrative task comprises editing at least one user account in at least one of the namespaces.

33. The method of claim 32 wherein the administrative task comprises changing a sign-in name associated with one or more of the user accounts.

34. One or more computer readable storage media having computer-executable instructions for performing the method recited in claim 23.

35. A computer-readable storage medium having computer-executable components for delegating at least one administrative task from an authentication system to a plurality of administration systems, said components comprising:
an identifier component for maintaining a database of one or more namespaces, said database being maintained by an authentication system, said authentication system being connected to a plurality of administration systems via a data communication network, said authentication system associating a plurality of namespaces with the plurality of administration systems, wherein each of the namespaces is associated with one of the plurality of administration systems, said administration systems providing a service associated with the associated namespaces to one or more user accounts of the namespace on the data communication network;
an interface component for receiving a call from one of the administration systems by the authentication system, said call providing a request that at least one routine be performed to implement a desired administrative task for managing the user accounts of the namespace associated with said one of the administration systems; and an operation component for executing the routine, by the authentication system, in response to the call received from said one of the administration systems to implement the administrative task.

36. The computer-readable storage medium of claim 35, wherein the interface component comprises an application programming interface for implementing the routine.

37. The computer-readable storage medium of claim 35, wherein the routine comprises computer-executable instructions for:

reserving at least one of the namespaces to prevent an unauthorized user from obtaining an account in the reserved namespace;

editing one or more user accounts in the namespace;

maintaining and editing a namespace administrator list; and releasing the reserved namespace to allow an unauthorized user to obtain an account in the namespace.

38. A system for authenticating at least one user of a namespace service, said system comprising:

one or more user databases storing authentication information for user accounts of a plurality of namespaces;

an authentication server for communicating with the database via a data communication network; and a plurality of administration servers for communicating with the authentication server via the data communication network, said plurality of administration servers being associated with the plurality of namespaces and providing the namespace service, wherein each of the namespaces is associated with one of the plurality of administration servers, said administration servers being responsive to an administrator for issuing at least one request to said authentication server, said request specifying at least one action for managing the user accounts of the namespaces to be performed in relation to the namespace service.

39. The system of claim 38, further comprising a nexus database storing administration information selected from a group consisting of an affiliate list, namespaces, the location of the user databases, and administration server information.

40. The system of claim 38, wherein the authentication information comprises a login and password associated with each user.

41. The system of claim 38, wherein the plurality of administration servers and authentication server communicate on the data communication network via a simple object access protocol (SOAP).

42. The system of claim 38, wherein the plurality of administration servers is associated with an affiliate selected from a group consisting of an application service provider, an Internet service provider, a namespace owner, and a namespace provisioning partner.

43. The system of claim 38, wherein the user obtains a namespace identifier from the authentication system via the plurality of administration servers.

44. The system of claim 43, wherein the namespace identifier is an electronic mail address associated with a user account with the authentication system.

* * * * *

UNITED STATES PATENT AND TRADEMARK OFFICE
CERTIFICATE OF CORRECTION

| | | |
|---|---|---|
| PATENT NO. | : 7,330,971 B1 | Page 1 of 1 |
| APPLICATION NO. | : 10/675255 | |
| DATED | : February 12, 2008 | |
| INVENTOR(S) | : Sachin Kukreja et al. | |

It is certified that error appears in the above-identified patent and that said Letters Patent is hereby corrected as shown below:

In column 49, line 49, in Claim 23, delete "maintaining" and insert -- maintaining, --, therefor.

Signed and Sealed this

Fifteenth Day of February, 2011

David J. Kappos
*Director of the United States Patent and Trademark Office*